United States Patent
Hayashi et al.

(10) Patent No.: US 9,205,327 B2
(45) Date of Patent: Dec. 8, 2015

(54) STORAGE MEDIUM HAVING INFORMATION PROCESSING PROGRAM STORED THEREON, INFORMATION PROCESSING APPARATUS, INFORMATION PROCESSING SYSTEM, AND INFORMATION PROCESSING METHOD

(75) Inventors: Yugo Hayashi, Kyoto (JP); Kazuya Sumaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 681 days.

(21) Appl. No.: 13/333,045

(22) Filed: Dec. 21, 2011

(65) Prior Publication Data

US 2012/0229372 A1 Sep. 13, 2012

(30) Foreign Application Priority Data

| Mar. 8, 2011 | (JP) | 2011-050039 |
|---|---|---|
| Apr. 5, 2011 | (JP) | 2011-083453 |
| Apr. 5, 2011 | (JP) | 2011-083454 |
| Apr. 5, 2011 | (JP) | 2011-083455 |
| Apr. 5, 2011 | (JP) | 2011-083456 |
| May 24, 2011 | (JP) | 2011-115402 |
| May 24, 2011 | (JP) | 2011-115403 |
| May 24, 2011 | (JP) | 2011-115404 |
| May 27, 2011 | (JP) | 2011-118901 |
| May 27, 2011 | (JP) | 2011-118902 |
| Jun. 1, 2011 | (JP) | 2011-123644 |
| Jun. 1, 2011 | (JP) | 2011-123645 |
| Jun. 1, 2011 | (JP) | 2011-123646 |
| Oct. 13, 2011 | (JP) | 2011-225538 |

(51) Int. Cl.
*G09G 5/00* (2006.01)
*A63F 13/20* (2014.01)

(52) U.S. Cl.
CPC ........... *A63F 13/06* (2013.01); *A63F 2300/105* (2013.01); *A63F 2300/1068* (2013.01); *A63F 2300/301* (2013.01); *A63F 2300/403* (2013.01); *A63F 2300/6045* (2013.01);
(Continued)

(58) Field of Classification Search
None
See application file for complete search history.

(56) References Cited

U.S. PATENT DOCUMENTS

| 5,838,909 A | 11/1998 | Roy et al. |
|---|---|---|
| 5,853,324 A | 12/1998 | Kami et al. |
| 6,201,554 B1 | 3/2001 | Lands |

(Continued)

FOREIGN PATENT DOCUMENTS

| EP | 1 726 342 A2 | 11/2006 |
|---|---|---|
| EP | 2 218 485 | 8/2010 |

(Continued)

OTHER PUBLICATIONS

Nov. 21, 2012 Office Action from U.S. Appl. No. 13/271,510, 22 pages.

(Continued)

*Primary Examiner* — Christopher R Lamb
(74) *Attorney, Agent, or Firm* — Nixon & Vanderhye, P.C.

(57) ABSTRACT

Data which is output from an input device capable of allowing a body of a user to get thereon and is based on a load applied on the input device is usable. Data is acquired from the input device is processed. A center-of-gravity position of a load applied on the input device is repeatedly acquired based on data output from the input device. A user direction a stepping action made on the input device is calculated using the center-of-gravity position. Predetermined processing is performed based on the user direction.

21 Claims, 15 Drawing Sheets

(52) U.S. Cl.
CPC  *A63F 2300/6676* (2013.01); *A63F 2300/6684* (2013.01); *A63F 2300/8005* (2013.01)

(56) References Cited

U.S. PATENT DOCUMENTS

| | | | |
|---|---|---|---|
| 6,225,977 | B1 | 5/2001 | Li |
| 6,290,600 | B1 | 9/2001 | Glasson |
| 6,416,410 | B1 | 7/2002 | Abou-Samra et al. |
| 6,450,886 | B1 | 9/2002 | Oishi et al. |
| 6,483,540 | B1 | 11/2002 | Akasawa et al. |
| 6,500,070 | B1 | 12/2002 | Tomizawa et al. |
| 6,540,614 | B1 | 4/2003 | Nishino et al. |
| 6,712,703 | B2 | 3/2004 | Miyamoto et al. |
| 6,762,746 | B2 | 7/2004 | Fukuda |
| 6,966,837 | B1 | 11/2005 | Best |
| 7,326,117 | B1 | 2/2008 | Best |
| 7,588,498 | B2 | 9/2009 | Iizuka et al. |
| 2002/0022518 | A1* | 2/2002 | Okuda et al. ............... 463/36 |
| 2002/0140666 | A1 | 10/2002 | Bradski |
| 2002/0165028 | A1 | 11/2002 | Miyamoto et al. |
| 2003/0134665 | A1 | 7/2003 | Kato et al. |
| 2003/0216176 | A1 | 11/2003 | Shimizu et al. |
| 2003/0220142 | A1 | 11/2003 | Siegel |
| 2004/0046736 | A1 | 3/2004 | Pryor et al. |
| 2004/0092309 | A1 | 5/2004 | Suzuki |
| 2004/0229687 | A1 | 11/2004 | Miyamoto et al. |
| 2005/0014543 | A1 | 1/2005 | Itoi et al. |
| 2005/0119053 | A1 | 6/2005 | Suzuki et al. |
| 2005/0130738 | A1 | 6/2005 | Miyamoto et al. |
| 2005/0187015 | A1 | 8/2005 | Suzuki et al. |
| 2005/0255900 | A1 | 11/2005 | Takahashi et al. |
| 2006/0017692 | A1 | 1/2006 | Wehrenberg et al. |
| 2006/0040740 | A1 | 2/2006 | DiDato |
| 2006/0046848 | A1 | 3/2006 | Abe et al. |
| 2006/0262120 | A1* | 11/2006 | Rosenberg ............... 345/473 |
| 2006/0262210 | A1 | 11/2006 | Smith et al. |
| 2006/0266200 | A1 | 11/2006 | Goodwin |
| 2007/0007143 | A1 | 1/2007 | Hayashi et al. |
| 2007/0008298 | A1 | 1/2007 | Ohta |
| 2007/0015577 | A1 | 1/2007 | Hsu |
| 2007/0018968 | A1 | 1/2007 | Iwamoto et al. |
| 2007/0072662 | A1 | 3/2007 | Templeman |
| 2007/0073196 | A1 | 3/2007 | Tanaka et al. |
| 2007/0208528 | A1 | 9/2007 | Seo et al. |
| 2007/0265085 | A1 | 11/2007 | Miyamoto et al. |
| 2008/0009332 | A1 | 1/2008 | Kake |
| 2008/0042973 | A1 | 2/2008 | Zhao et al. |
| 2008/0062198 | A1 | 3/2008 | Takahashi et al. |
| 2008/0070686 | A1 | 3/2008 | Satsukawa et al. |
| 2008/0096654 | A1 | 4/2008 | Mondesir et al. |
| 2008/0096657 | A1 | 4/2008 | Benoist |
| 2008/0102951 | A1 | 5/2008 | Eto et al. |
| 2008/0216974 | A1 | 9/2008 | Pitcher et al. |
| 2008/0254821 | A1 | 10/2008 | Kusuda et al. |
| 2008/0261696 | A1 | 10/2008 | Yamazaki et al. |
| 2008/0268956 | A1 | 10/2008 | Suzuki |
| 2008/0274813 | A1 | 11/2008 | Sato |
| 2008/0318681 | A1 | 12/2008 | Rofougaran et al. |
| 2009/0069096 | A1 | 3/2009 | Nishimoto |
| 2009/0070093 | A1 | 3/2009 | Nakanishi et al. |
| 2009/0093305 | A1 | 4/2009 | Okamoto et al. |
| 2009/0156308 | A1 | 6/2009 | Hsu |
| 2009/0187371 | A1 | 7/2009 | Ohta |
| 2009/0244064 | A1 | 10/2009 | Inokuchi et al. |
| 2009/0298585 | A1 | 12/2009 | Cannon et al. |
| 2009/0303204 | A1 | 12/2009 | Nasiri et al. |
| 2010/0045666 | A1 | 2/2010 | Kornmann et al. |
| 2010/0045667 | A1 | 2/2010 | Kornmann et al. |
| 2010/0048357 | A1 | 2/2010 | Nakagawa et al. |
| 2010/0053322 | A1 | 3/2010 | Marti et al. |
| 2010/0058254 | A1 | 3/2010 | Narita |
| 2010/0081505 | A1 | 4/2010 | Alten et al. |
| 2010/0087248 | A1 | 4/2010 | Takahashi |
| 2010/0137063 | A1* | 6/2010 | Shirakawa et al. ........... 463/31 |
| 2010/0169110 | A1 | 7/2010 | Sawano et al. |
| 2010/0178988 | A1 | 7/2010 | Izuno et al. |
| 2010/0245236 | A1 | 9/2010 | Takayama |
| 2010/0245685 | A1 | 9/2010 | Onodera et al. |
| 2010/0279770 | A1 | 11/2010 | Ikeda |
| 2010/0283723 | A1 | 11/2010 | Konishi |
| 2010/0285882 | A1 | 11/2010 | Hsu |
| 2010/0292006 | A1 | 11/2010 | Terrell et al. |
| 2010/0302238 | A1 | 12/2010 | Yonemori et al. |
| 2010/0304857 | A1 | 12/2010 | Suzuki et al. |
| 2011/0039618 | A1 | 2/2011 | Ichiyanagi et al. |
| 2011/0054359 | A1 | 3/2011 | Sazonov et al. |
| 2011/0070953 | A1 | 3/2011 | Konishi |
| 2011/0077088 | A1 | 3/2011 | Hayashi et al. |
| 2011/0092289 | A1 | 4/2011 | Dagman et al. |
| 2011/0159960 | A1 | 6/2011 | Ueshima et al. |
| 2011/0169928 | A1 | 7/2011 | Gassel et al. |
| 2011/0172013 | A1 | 7/2011 | Shirasaka et al. |
| 2011/0244956 | A1 | 10/2011 | Sakakibara et al. |
| 2011/0244957 | A1 | 10/2011 | Nishimura et al. |
| 2011/0250964 | A1 | 10/2011 | Kulas |
| 2011/0250965 | A1 | 10/2011 | Kulas et al. |
| 2011/0281650 | A1 | 11/2011 | Yamazaki et al. |
| 2011/0300930 | A1 | 12/2011 | Hsu |
| 2011/0306425 | A1 | 12/2011 | Rivard et al. |
| 2012/0014558 | A1 | 1/2012 | Stafford et al. |
| 2012/0017236 | A1 | 1/2012 | Stafford et al. |
| 2012/0079080 | A1 | 3/2012 | Pishevar |
| 2012/0086630 | A1 | 4/2012 | Zhu et al. |
| 2012/0086631 | A1 | 4/2012 | Osman et al. |
| 2012/0115596 | A1 | 5/2012 | Otani |
| 2012/0115609 | A1 | 5/2012 | Sugiyama et al. |
| 2013/0017876 | A1 | 1/2013 | Koumbourlis |
| 2013/0038532 | A1 | 2/2013 | Okura et al. |

FOREIGN PATENT DOCUMENTS

| | | |
|---|---|---|
| EP | 2 497 545 A2 | 9/2012 |
| EP | 2 497 545 A3 | 10/2012 |
| EP | 2015854 | 11/2013 |
| GB | 2 442 259 | 4/2008 |
| JP | H07-36612 A | 2/1995 |
| JP | H9-091110 | 4/1997 |
| JP | H 09-294260 | 11/1997 |
| JP | H11-90043 A | 4/1999 |
| JP | 2000-316143 | 11/2000 |
| JP | 2000-325653 | 11/2000 |
| JP | 2001-34247 A | 2/2001 |
| JP | 2002-298160 | 10/2002 |
| JP | 2002-325963 | 11/2002 |
| JP | 2003-61940 | 3/2003 |
| JP | 2003-512142 | 4/2003 |
| JP | 2003-325974 A | 11/2003 |
| JP | 2003-334379 | 11/2003 |
| JP | 2004-030408 | 1/2004 |
| JP | 2004-159781 | 6/2004 |
| JP | 2004-329744 | 11/2004 |
| JP | 2005-103154 | 4/2005 |
| JP | 2005-137921 | 6/2005 |
| JP | 2005-230263 | 9/2005 |
| JP | 2006-31307 | 2/2006 |
| JP | 2006-39635 | 2/2006 |
| JP | 2007-301048 | 11/2007 |
| JP | 2008-15679 | 1/2008 |
| JP | 2008-264195 | 11/2008 |
| JP | 2008-264402 | 11/2008 |
| JP | 2009-172010 | 8/2009 |
| JP | 2009-237680 | 10/2009 |
| JP | 2009-536058 | 10/2009 |
| JP | 2010-055511 | 3/2010 |
| JP | 2010-233705 | 10/2010 |
| JP | 2010-259611 | 11/2010 |
| JP | 2010-273839 | 12/2010 |
| JP | 2011-015752 | 1/2011 |
| JP | 2011-19810 | 2/2011 |
| JP | 2011-019817 | 2/2011 |
| JP | 2011-53838 | 3/2011 |
| JP | 2011-056049 | 3/2011 |
| WO | 00/67864 | 11/2000 |
| WO | WO 01/30470 A1 | 5/2001 |

(56) References Cited

FOREIGN PATENT DOCUMENTS

| WO | WO 2004/103244 | 2/2004 |
|---|---|---|
| WO | 2010/060211 | 6/2010 |
| WO | 2011/004629 | 1/2011 |

OTHER PUBLICATIONS

Sep. 4, 2012 European Search Report for EP 11184519.4, 6 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.
Sep. 4, 2012 European Search Report for EP 11187473.1, 7 pages.
Sep. 7, 2012 European Search Report for EP 12156629.3, 7 pages.
Apr. 10, 2013 Office Action from U.S. Appl. No. 13/277,561, 43 pages.
Oct. 17, 2013 Office Action in U.S. Appl. No. 13/287,320, 65 pages.
Aug. 29, 2013 Office Action in U.S. Appl. No. 13/362,289, 71 pages.
Aug. 29, 2013 Office Action in U.S. Appl. No. 13/400,944, 58 pages.
Aug. 29, 2013 Office Action in U.S. Appl. No. 13/402,026, 87 pages.
Aug. 30, 2013 Office Action in U.S. Appl. No. 13/1401,054, 71 pages.
Oct. 1, 2013 Search Report in EP 12156630.1, 9 pages.
Jul. 18, 2013 Office Action in U.S. Appl. No. 13/362,255, 20 pages.
Dec. 5, 2013 Office Action in U.S. Appl. No. 13/283,032, 35 pages.
Office Action in U.S. Appl. No. 13/362,255 dated Apr. 10, 2014.
European Search Report EP Application No. 12 15 0272.8 dated Oct. 28, 2014.
European Search Report EP Application No. 12 15 3067.9 dated Oct. 29, 2014.
U.S. Office Action dated Jun. 27, 2014 issued in co-pending U.S. Appl. No. 13/283,072.
Final Office Action (36 pages) dated Jul. 2, 2014 issued in co-pending U.S. Appl. No. 13/283,032.
Office Action dated Dec. 10, 2014 in corresponding U.S. Appl. No. 13/283,032.
The Legend of Zelda: Ocarina of Time, Nintendo DREAM, Kabushiki Kaisha Anbitto, Mar. 1, 2011, vol. 203 p. 11.
European Search Report for EP11194630.7 dated Feb. 16, 2015.
Office Action in corresponding U.S. Appl. No. 13/287,320 dated Feb. 27, 2015.
Office Action in corresponding U.S. Appl. No. 13/343,913 dated Mar. 4, 2015.
Office Action dated Aug. 20, 2014 issued in U.S. Appl. No. 13/343,913.
Office Action in co-pending U.S. Appl. No. 13/271,510 dated Sep. 18, 2014.
Office Action in co-pending U.S. Appl. No. 13/287,320 dated Oct. 3, 2014.
Office Action in co-pending U.S. Appl. No. 13/283,072 dated Oct. 10, 2014.
Wei et al., "Novel Interface for First Person Shooting Games on PDAs," 2008, pp. 113-121.
Office Action in corresponding U.S. Appl. No. 13/343,913 dated Jul. 29, 2015.
Decision of Refusal in corresponding Japanese Appln. No. 2011-123645 dated Aug. 6, 2015.
Office Action dated Jun. 30, 2015 in corresponding U.S. Appl. No. 13/287,320.
Office Action in corresponding Japanese Patent Application No. 2011-225538 mailed May 21, 2015.
Office Action in corresponding U.S. Appl. No. 13/352,091 dated May 1, 2015.
"Minna no Ennichi," Shukan Famitsu, vol. 27, No. 10, Enterbrain Inc., Feb. 23, 2012, pp. 32-33.
"Close-up!," Mobile Software Palm OS, Mobile PRESS, vol. 5, No. 1, Japan—Gijutsu-Hyohron Co., Ltd., Feb. 24, 2005, p. 213.
"iPhone 3G Perfect Guide," Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job jp/blog/2009/06/iponeipod-touch.html.
Office Action dated Aug. 28, 2015 issued in corresponding JP Patent Application No. 2011-123644.
Office Action dated Sep. 1, 2015 issued in corresponding JP Patent Application No. 2011-118901 and English Translation.
Office Action dated Sep. 1, 2015 issued in corresponding JP Patent Application No. 2011-115402 and English Translation.
Office Action dated Sep. 1, 2015 issued in corresponding JP Patent Application No. 2011-115404 and English Translation.

* cited by examiner

STORAGE MEDIUM HAVING INFORMATION PROCESSING PROGRAM STORED THEREON, INFORMATION PROCESSING APPARATUS, INFORMATION PROCESSING SYSTEM, AND INFORMATION PROCESSING METHOD

CROSS REFERENCE TO RELATED APPLICATION

The disclosures of Japanese Patent Application No. 2011-050039 filed on Mar. 8, 2011, Japanese Patent Applications Nos. 2011-083453, 2011-083454, 2011-083455 and 2011-083456 filed on Apr. 5, 2011, Japanese Patent Applications Nos. 2011-115402, 2011-115403 and 2011-115404 filed on May 24, 2011, Japanese Patent Applications Nos. 2011-118901 and 2011-118902 filed on May 27, 2011, Japanese Patent Applications Nos. 2011-123644, 2011-123645 and 2011-123646 filed on Jun. 1, 2011, and Japanese Patent Application No. 2011-225538 filed on Oct. 13, 2011 are incorporated herein by reference.

FIELD

The technology described herein relates to a storage medium having an information processing program stored thereon, an information processing apparatus, an information processing system, and an information processing method, and specifically to a storage medium having an information processing program stored thereon, an information processing apparatus, an information processing system, and an information processing method for, for example, performing processing based on an action of a user.

BACKGROUND AND SUMMARY

Conventionally, there is a game system which allows a user to play a game based on a change of a load applied by the user. For example, in the above-mentioned game system, when a user gets on a board type controller including a load sensor, the load sensor detects a load value. Based on the load value, game processing is executed.

However, in the above-mentioned game system, the game processing is executed in the state where a direction of the board type controller and a direction of the user on the board type controller are defined in a fixed manner in advance. Therefore, the user is always requested to make an operation conformed to the defined direction, which limits operation methods. For example, when the user makes an operation while being oriented in a direction different from the defined direction on the board type controller, the operation made by the user cannot be accurately input to a game apparatus, and thus the game processing desired by the user cannot be executed.

Accordingly, an object of this example embodiment is to provide a storage medium having an information processing program stored thereon, an information processing apparatus, an information processing system, and an information processing method capable of making an accurate determination on an action of a user and performing processing suitable to the action.

In order to achieve the above object, the example embodiment has, for example, the following features. It should be understood that the scope of the example embodiment is interpreted only by the scope of the claims. In event of any conflict between the scope of the claims and the scope of the description in this section, the scope of the claims has priority.

An example of a configuration of a computer-readable storage medium having an information processing program stored thereon is executed by a computer of an information processing apparatus capable of using data which is output from an input device capable of allowing a body of a user to get thereon and is based on a load applied on the input device, the information processing apparatus being for processing data acquired from the input device. The information processing program allows the computer to execute repeatedly acquiring a center-of-gravity position of a load applied on the input device, based on data output from the input device; calculating a user direction of a stepping action made on the input device, using the center-of-gravity position; and performing predetermined processing based on the user direction.

According to the above configuration, the user direction on the input device can be determined, and thus the processing suitable to the user direction can be performed.

The user direction may be calculated based on a moving direction of the center-of-gravity position.

According to the above configuration, the user direction can be easily calculated based on the moving direction of the center-of-gravity position of the load applied on the input device.

The user direction may be calculated using a direction candidate which is vertical to a straight line connecting two center-of-gravity positions acquired at different timings.

According to the above configuration, the user direction can be easily calculated using the direction which is vertical to a straight line connecting two center-of-gravity positions acquired at different timings.

The user direction may be calculated using a direction candidate which is vertical to a straight line connecting two center-of-gravity positions acquired at different timings successively.

According to the above configuration, the user direction can be easily calculated using the direction which is vertical to a straight line connecting two center-of-gravity positions acquired at different timings successively.

The user direction may be updated by making the user direction determined by immediately previous processing closer to a direction represented by the direction candidate by a predetermined ratio.

According to the above configuration, the user direction is made closer to a direction represented by a newly obtained direction candidate by a predetermined ratio. Thus, the user direction can be updated to a user direction suitable to the action of the user while an error or the like involved in the newly obtained direction candidate is removed.

The ratio may be set to be larger as a distance between the center-of-gravity positions used for calculating the direction candidate is longer.

According to the above configuration, weighting can be performed such that the user direction is changed by a large amount when the moving amount of the center-of-gravity position is long, and thus the user direction can be estimated more accurately.

The user direction determined by the immediately previous processing does not need to be changed when the distance between the center-of-gravity positions used for calculating the direction candidate is shorter than a predetermined length.

According to the above configuration, an error which is caused when the user direction is estimated by use of a direction candidate can be removed.

A direction candidate which is vertical to a straight line connecting two center-of-gravity positions acquired at different timings repeatedly may be repeatedly calculated, and one candidate direction may be calculated based on a plurality of direction candidate repeatedly calculated.

According to the above configuration, one direction candidate is calculated using a plurality of direction candidates. Thus, the influence exerted on the estimation of the user direction by an error caused to the direction candidates unexpectedly.

One of a pair of directions vertical to the straight line which is closer to the user direction set currently may be calculated as the direction candidate.

According to the above configuration, the user direction can be determined more accurately utilizing that the user direction is not drastically changed.

When one of a pair of directions vertical to the straight line is present within a predetermined range, the other direction may be calculated as the direction candidate.

According to the above configuration, the precision of determination on the user direction can be improved by removing a user direction at a posture which is unlikely to be assumed by the user on the input device.

A direction candidate vector which is vertical to a straight line connecting two center-of-gravity positions acquired at different timings repeatedly and has a size equal to a distance between the two center-of-gravity positions may be repeatedly calculated, and a direction of one vector obtained by adding a plurality of direction candidate vectors calculated repeatedly may be calculated as the direction candidate.

According to the above configuration, the direction of the vector obtained as a result of the addition is the direction obtained by weighting performed with the moving amount of the center of gravity. Therefore, the user direction can be estimated more accurately.

One of a pair of directions vertical to the straight line which is closer to the user direction set currently may be calculated as the direction of the direction candidate vector.

According to the above configuration, the user direction can be determined more accurately utilizing that the user direction is not drastically changed.

When one of a pair of directions vertical to the straight line is present within a predetermined range, the other direction may be calculated as the direction of the direction candidate vector.

According to the above configuration, the precision of determination on the user direction can be improved by removing a user direction at a posture which is unlikely to be assumed by the user on the input device.

The information processing program may allow the computer to further execute setting at least one determination line extending in the calculated user direction. In this case, when the center-of-gravity position acquired repeatedly crosses the determination line, it may be determined that the user has made a stepping action on the input device and the predetermined processing may be performed based on the determination.

According to the above configuration, the user direction can be used for a determination on the stepping action on the input device.

The information processing program may allow the computer to further execute calculating a stepping central position of the user making the stepping action on the input device, based on the acquired center-of-gravity position. In this case, the determination line may be set at a position, in the user direction, having the stepping central position as a reference.

According to the above configuration, the determination line used for the determination on the stepping action can be set at an appropriate position.

Two said determination lines extending in the user direction at positions which have the stepping central position as the center therebetween and are distanced from the stepping central position by a predetermined gap may be set. It may be determined that the user has made a stepping action with one of user's legs on the input device when the center-of-gravity position crosses one of the determination lines after moving across the gap, it may be determined that the user has made a stepping action with the other of the user's legs on the input device when the center-of-gravity position crosses the other of the determination lines after moving across the gap, and the predetermined processing may be performed based on the determination.

According to the above configuration, determinations on the left foot stepping action and the right foot stepping action are made by different determination lines. Thus, a more accurate determination on the stepping action can be made.

The stepping central position may be set at a position which follows, at a predetermined ratio, the center-of-gravity position acquired repeatedly.

The stepping central position may be set at a position obtained by averaging the center-of-gravity positions acquired repeatedly during a predetermined time period.

According to the above configuration, the stepping central position can be easily calculated.

A width of the gap may be changed in accordance with an angle of the user direction with respect to a predetermined reference direction.

According to the above configuration, an appropriate determination line can be set in accordance with the shape or the like of the input device.

The predetermined processing may be performed by changing a direction of at least one of an object set in a virtual world and a virtual camera, based on the user direction.

According to the above configuration, the direction of the object in the virtual world or the virtual camera can be changed in accordance with the user direction.

The example embodiment may be implemented in the form of an information processing apparatus or an information processing system including units for performing each of the above-described processing or an information processing method including each of the above-described motions.

According to the example embodiment, it is made possible to determine the user direction on the input device and perform processing suitable to the user direction.

These and other objects, features, aspects and advantages of this example embodiment will become more apparent from the following detailed description when taken in conjunction with the accompanying drawings.

DETAILED DESCRIPTION OF NON-LIMITING EXAMPLE EMBODIMENTS

Figure 1:
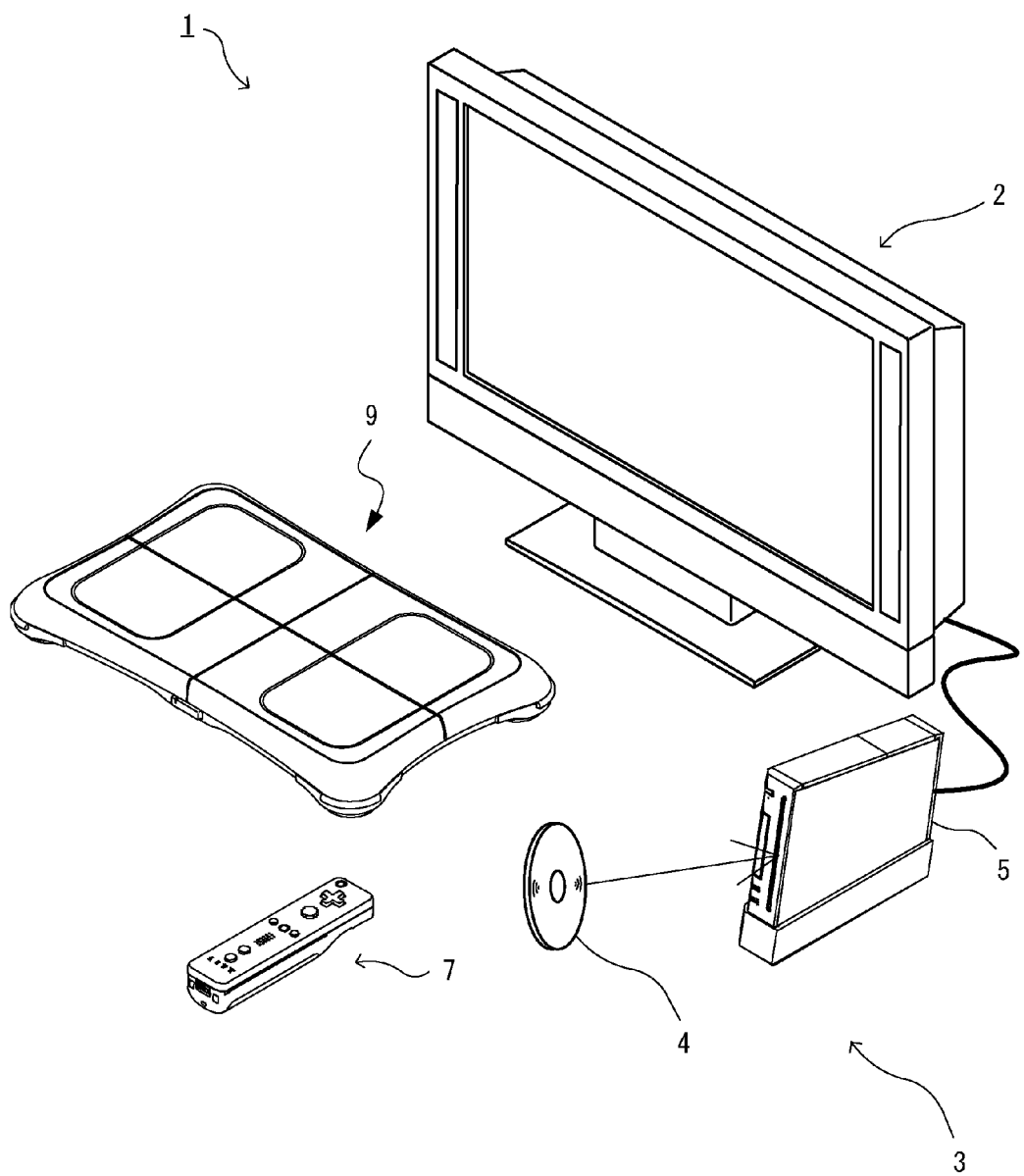
FIG. 1 is an external view showing a non-limiting example of a game system 1.
Figure 2:
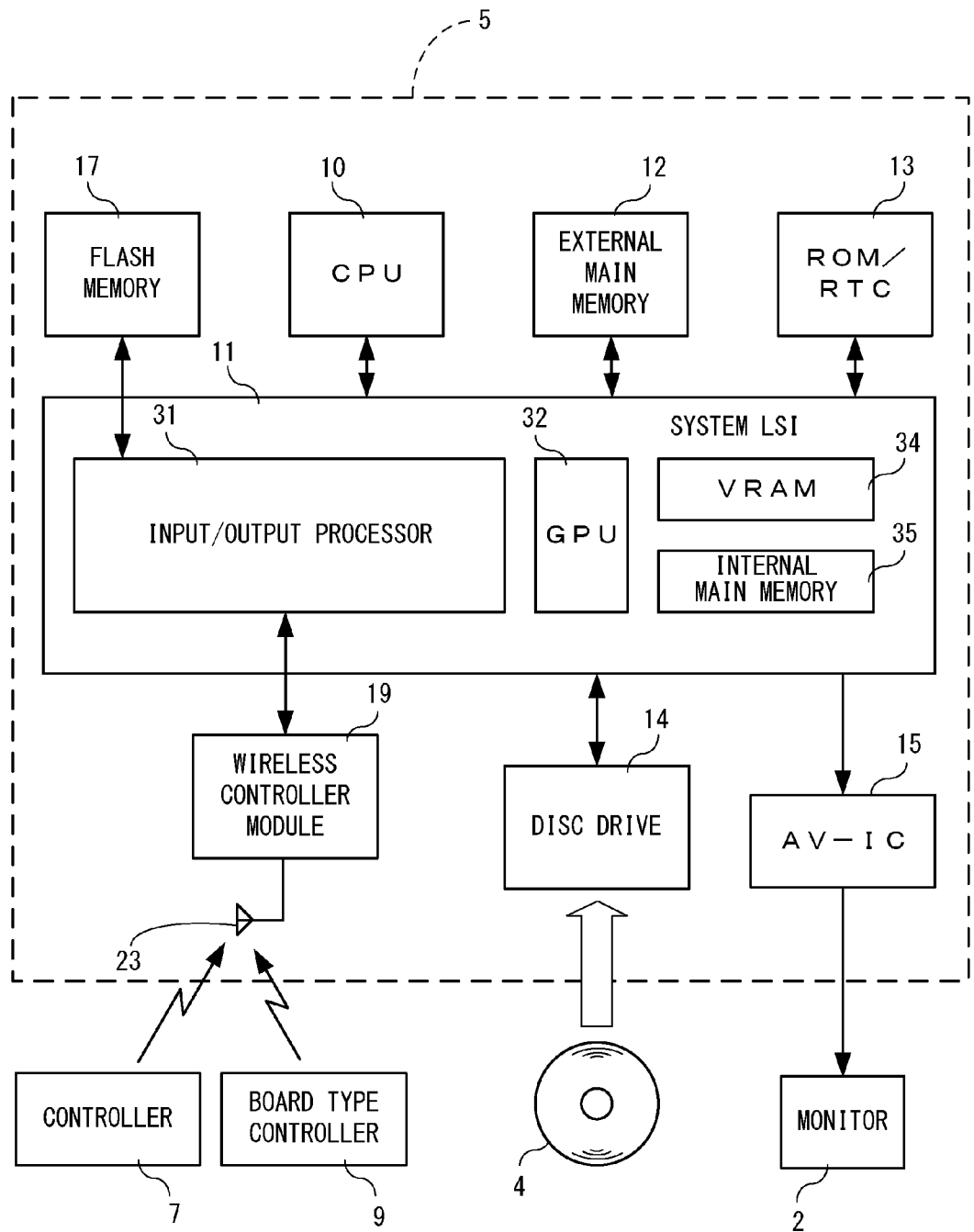
FIG. 2 is a functional block diagram showing a non-limiting example of a game apparatus main body 5 shown in FIG. 1.

With reference to FIG. 1, an information processing apparatus for executing an information processing program according to an example embodiment and an information processing system including the information processing apparatus will be described. Hereinafter, in order to provide a specific description, an installation type game apparatus main body 5 will be used as an example of the information processing apparatus, and a game system including the installation type game apparatus main body 5 will be used for the description. FIG. 1 is an external view showing an example of a game system 1 including an installation type game apparatus 3. FIG. 2 is a block diagram showing an example of the game apparatus main body 5. Hereinafter, the game system 1 will be described.

As shown in FIG. 1, the game system 1 includes a home-use TV receiver (hereinafter, referred to as a "monitor") 2 as an example of display means and the installation type game apparatus 3 connected to the monitor 2 via a connection cord. The monitor 2 includes a speaker for outputting an audio signal which is output from the game apparatus 3. The game apparatus 3 includes an optical disc 4 having stored thereon a program as an example of an information processing program according to the example embodiment (e.g., a game program), the game apparatus main body 5 having a computer mounted thereon for executing the program stored on the optical disc 4 and causing the monitor 2 to display a game screen, a controller 7 for providing the game apparatus main body 5 with operation information used to make operations on an object or the like displayed in the game screen, and a board type controller 9. The game system 1 executes the game processing on the game apparatus main body 5 based on a game operation using at least the board type controller 9 and causes the display means such as the monitor 2 or the like to display a game screen obtained by the game processing. The game apparatus main body 5 is connected to the controller 7 and the board type controller 9 so as to be wirelessly communicable with each other. For example, the wireless communication is executed in conformity with the Bluetooth (registered trademark) standard, but may be executed in conformity with any other standard of infrared rays, wireless LAN or the like.

The game apparatus main body 5 has a built-in wireless controller module 19 (see FIG. 2). The wireless controller module 19 receives data which is wirelessly transmitted from the controller 7 and/or the board type controller and transmits data from the game apparatus main body 5 to the controller 7, and thus connects the controller 7 and/or the board type controller 9 and the game apparatus main body 5 to each other by wireless communication. The optical disc 4, which is an example of an exchangeably usable information storage medium, is detachably mounted on the game apparatus main body 5.

On the game apparatus main body 5, a flash memory 17 (see FIG. 2) acting as a backup memory for fixedly storing saved data or other data is mountable. The game apparatus main body 5 executes a game program or the like stored on the optical disc 4 and displays the result on the monitor 2 as a game image. The game program or the like to be executed is not necessarily stored on the optical disc 4 and may be stored on the flash memory 17 in advance. The game apparatus main body 5 can also reproduce a state of a game played in the past using saved data stored on the flash memory 17 and display a game image on the monitor 2. A user of the game apparatus 3 can enjoy the game by operating the controller 7 while watching the game image displayed on the monitor 2 or the like.

The controller 7 and the board type controller 9 wirelessly transmit transmission data such as the operation information or the like to the game apparatus main body 5 having the built-in wireless controller module 19 using, for example, the Bluetooth technology. The controller 7 is operation means mainly for making a selection from alternatives displayed on the display screen of the monitor 2. The controller 7 includes a housing having a size which can be held by one hand and a plurality of operation buttons (including a cross key, and the like) provided exposed on a surface of the housing.

In any other example, the controller 7 and/or the board controller 9 and the game apparatus main body 5 may be connected to each other in a wired manner. In this example, the game system 1 includes one controller 7 and one board type controller 9. Alternatively, the game apparatus main body 5 is communicable with a plurality of controllers 7 and a plurality of board type controllers 9. By using a predetermined number of controllers 7 and a predetermined number of board type controllers 9 at the same time, a plurality of users can play the game.

The controller 7 includes the housing formed of, for example, plastic molding. The housing is provided with a plurality of operation sections (operation buttons). The controller 7 transmits operation data indicating an input state on the operation sections (whether each of the operation buttons has been pressed or not) to the game apparatus main body 5. In an example described later, the game can be played without using the controller 7. A structure of the board type controller 9 will be described later in detail.

Now, with reference to FIG. 2, an internal structure of the game apparatus main body 5 will be described. FIG. 2 is a block diagram showing an example of a structure of the game apparatus main body 5. The game apparatus main body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs the processing by executing a program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11, for example, controls data transfer between the elements connected thereto, generates images to be displayed, and obtains data from external devices. An internal structure of the system LSI 11 will be described later. The external main memory 12, which is of a volatile type, has stored thereon a program read from the optical disc 4, a program read from the flash memory 17, or various other data. Thus, the external main memory 12 is used as a work area or a buffer area of the CPU 10. The ROM/RTC 13 includes a ROM having a program for starting the game apparatus main body 5 incorporated thereon (so-called boot ROM) and a clock circuit for counting time (RTC). The disc drive 14 reads program data, texture data or the like from the optical disc 4 and writes the read data onto an internal main memory 35 described later or the external main memory 12.

The system LSI 11 includes an input/output processor 31, a GPU (Graphics Processor Unit) 32, a VRAM (Video RAM) 34, and the internal main memory 35. Although not shown, these elements 31, 32, 34 and 35 are connected with each other via an internal bus.

The GPU 32 is a part of drawing means and generates an image in accordance with a graphics command (a command to draw an image) from the CPU 10. The VRAM 34 stores data used for the GPU 32 to execute the graphics command (polygon data, texture data or other data). The GPU 32 uses the data stored on the VRAM 34 to generate an image.

The image data generated as described above is read by the AV-IC 15. The AV-IC 15 outputs the read image data to the monitor 2. The AV-IC 15 also reads audio data generated by the system LSI 11 and outputs the read audio data to the speaker in the monitor 2. Thus, the image is displayed on the monitor 2 and also the sound is output from the speaker.

The input/output processor (I/O processor) 31 transmits or receives data to or from the elements connected thereto, or downloads data from external devices. The input/output processor 31 is connected to the flash memory 17 and the wireless controller module 19. The wireless controller module 19 is connected to an antenna 23.

The input/output processor 31 receives operation data or the like which is transmitted from the controller 7 and/or the board type controller 9 via the antenna 23 and the wireless controller module 19, and stores the operation data in a buffer area of the internal main memory 35 or the external main memory 12 (temporary storage). The internal main memory 35 may also store a program read from the optical disc 4, a program read from the flash memory 17, or various other data, or may be used as a work area or a buffer area of the CPU 10, like the external main memory 12.

The input/output processor 31 may be connected to a network via a wireless communication module or an antenna (not shown) to communicate with other game apparatuses or various servers also connected to the network. The input/output processor 31 also receives data transmitted from the other game apparatuses or data downloaded from download servers via the network, the antenna or the wireless communication module, and stores the received data on the flash memory 17. The flash memory 17 may have stored thereon data saved as a result of playing the game using the game apparatus main body 5 (data after or in the middle of the processing) as well as the data to be transmitted to, or data received from, the other game apparatuses or various servers.

Figure 3:
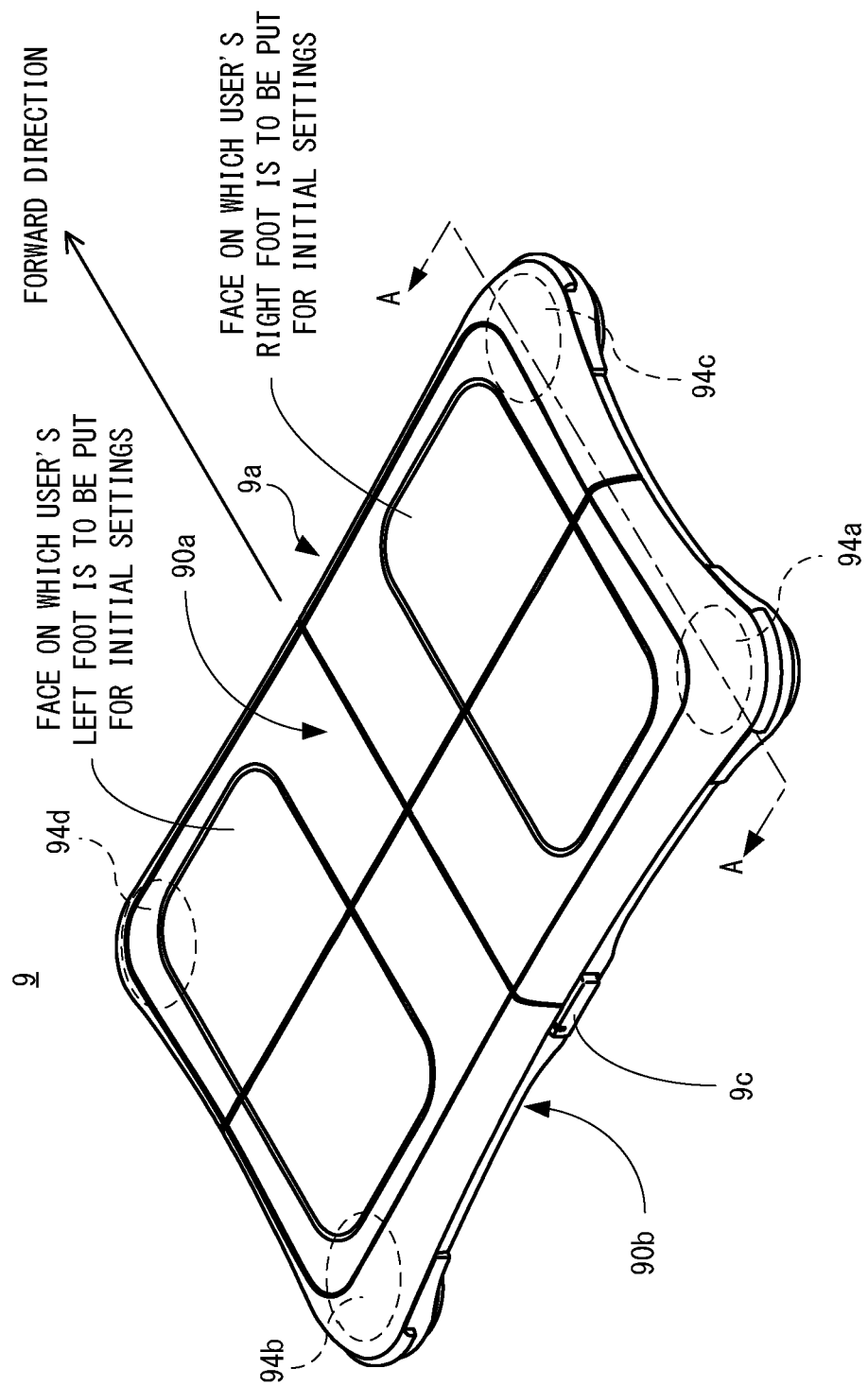
FIG. 3 is an isometric view showing a non-limiting example of an external appearance of a board type controller 9 shown in FIG. 1.

Now, with respect to FIG. 3 and FIG. 4, a structure of the board type controller 9 will be described. FIG. 3 is an isometric view showing an example of an external view of the board type controller 9 shown in FIG. 1. As shown in FIG. 3, the board type controller 9 includes a platform 9a on which the user can get (the user can put his/her foot), and at least four load sensors 94a through 94d for detecting a load applied on the platform 9a. The load sensors 94a through 94d are accommodated inside the platform 9a, and a position of each thereof is represented by dashed line in FIG. 3. In the following description, the four load sensors 94a through 94d may be collectively referred to as the "load sensors 94" or "load sensor 94".

The platform 9a is formed to be generally parallelepiped and is generally rectangular as viewed from above. For example, a shorter side of the rectangular shape of the platform 9a is set to be about 30 cm, and a longer side thereof is set to be about 50 cm. A top surface of the platform 9a is formed to be flat, and has a pair of faces on which the user puts his/her soles when being on the platform 9a. Specifically, the top surface of the platform 9a is set to have a face on which the user puts his/her left foot (upper left area enclosed by double lines in FIG. 3) and a face on which the user puts his/her right foot (lower right area enclosed by double lines in FIG. 3) in the case where the platform 9a is located such that the side of the platform 9a having the power button 9c is located behind the user for initial settings. Side surfaces of four corners of the platform 9a are partially formed to, for example, protrude like a cylinder.

In the platform 9a, the four load sensors 94a through 94d are located at a predetermined interval. In this example, the four load sensors 94a through 94d are located along a peripheral edge of the platform 9a, specifically, at the four corners thereof. The interval between the load sensors 94a through 94d is set to an appropriate value such that an intention of the user regarding a game operation represented by his/her manner of applying a load on the platform 9a can be detected at high accuracy. For example, the load sensors 94a through 94d are located at positions where four legs provided at four bottom corners of the board type controller 9 are located.

Each of the load sensors 94 is, for example, a strain gauge (strain sensor) load cell, which is a load converter for converting an input load to an electrical signal. In the load sensor 94, a strain-generating body is deformed in accordance with an input load, resulting in a strain. This strain is converted into a change of electrical resistance by a strain sensor attached to the strain-generating body and then is converted into a change of voltage. Therefore, the load sensor 94 can output, from an output terminal thereof, a voltage signal representing the input load.

The load sensor 94 may be of any other type, such as a tuning fork vibration type, a string vibration type, an electrostatic capacitance type, a piezoelectric type, a magnetostrictive type, a gyroscopic type or the like.

The board type controller 9 further includes the power button 9c. When the power button 9c is operated (e.g., when the power button 9c is pressed) in the state where the board type controller 9 is not activated, power is supplied to each of circuit components (see FIG. 4) of the board type controller 9. However, there are cases where the board type controller 9 is powered on by a command from the game apparatus main body 5 and thus supply of power to the circuit components is started. The board type controller 9 may be automatically powered off when a state where the user is not thereon continues for a predetermined time period (e.g., 30 seconds) or longer. When the power button 9c is again operated in the state where the board type controller 9 is in an active state, the board type controller 9 may be powered off to stop supply of power to the circuit components.

Figure 4:
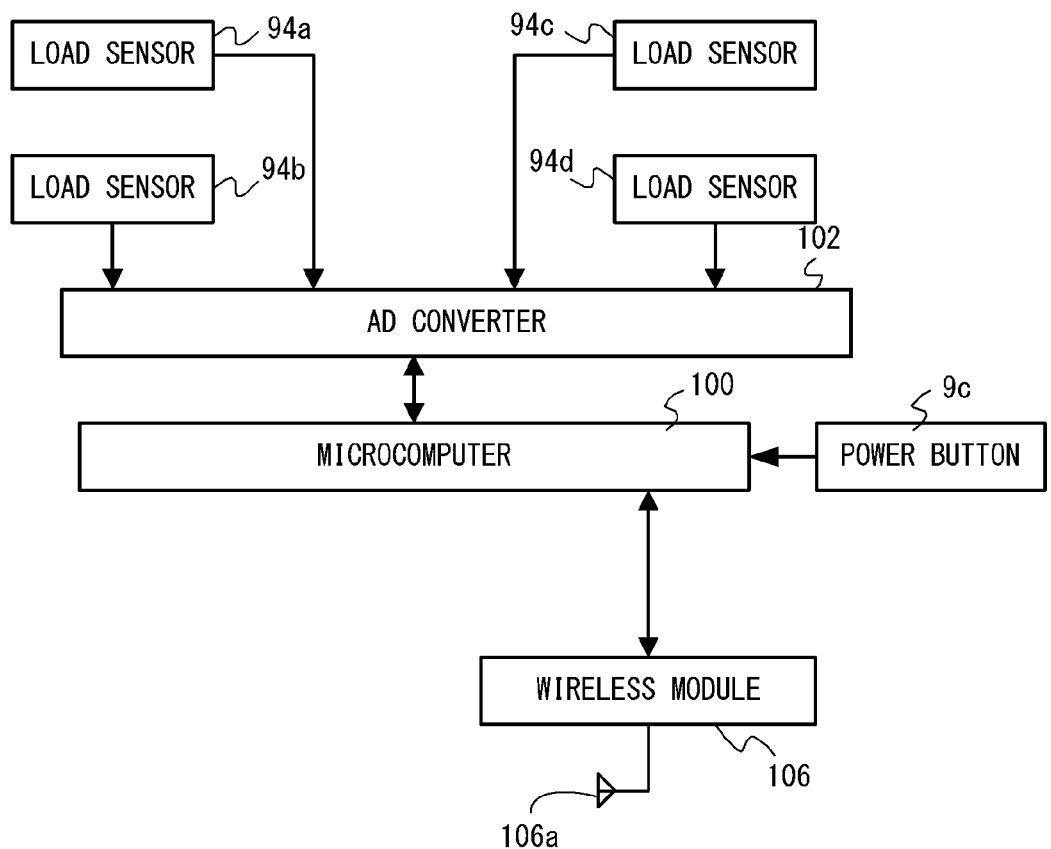
FIG. 4 is a block diagram showing a non-limiting example of an electrical configuration of the board type controller 9 shown in FIG. 1.

FIG. 4 is a block diagram showing an example of an electrical configuration of the board type controller 9. In FIG. 4, flows of signals and data are represented by solid arrows.

As shown in FIG. 4, the board type controller 9 includes a microcomputer 100 for controlling an operation thereof. The microcomputer 100 includes a CPU, a ROM, a RAM, and the like, which are not shown. The CPU controls the operation of the board type controller 9 in accordance with a program stored on the ROM.

The microcomputer 100 is connected to the power button 9c, an AD converter 102, and a wireless module 106. The wireless module 106 is connected to an antenna 106a. The four load sensors 94a through 94d are each connected to the AD converter 102.

The load sensors 94a through 94d each output a signal representing an input load. These signals, which are analog signals, are converted by the AD converter 102 into digital data and input to the microcomputer 100. Values detected by the load sensors 94a through 94d are provided with identification information of the load sensors 94a through 94d, so that it can be identified which of the load sensors 94a through 94d has detected which of the values. Thus, the microcomputer 100 can obtain data which represents the load detection values respectively detected by the four load sensors 94a through 94d at the same time.

The data representing the detection values detected by the load sensors 94a through 94d is transmitted as board operation data (input data) of the board type controller 9 from the microcomputer 100 to the game apparatus main body 5 via the wireless module 106 and the antenna 106a. For example, when a load is detected upon receipt of a command from the game apparatus main body 5, the microcomputer 100 transmits the detection value data of the load sensors 94a through 94d to the game apparatus main body 5 when receiving the detection value data from the AD converter 102. The microcomputer 100 may transmit the detection value data to the game apparatus main body 5 at an interval of a certain time period. When the transmission cycle is longer than the load detection cycle, data including load values detected at a plurality of timings until the transmission timing may be transmitted.

The wireless module 106 is set to be communicable by the same wireless standard as the wireless controller module 19 of the game apparatus main body 5 (Bluetooth, wireless LAN, etc.). Accordingly, the CPU 10 of the game apparatus main body 5 can transmit an information acquisition command to the board type controller 9 via the wireless controller module 19 or the like. Thus, the board type controller 9 can receive a command from the game apparatus main body 5 via the wireless module 106 and the antenna 106a. The board type controller 9 can also transmit board operation data including the load detection values (or the load calculation values) of the load sensors 94a through 94d to the game apparatus main body 5.

In the case of, for example, a game played by use of a simple sum of the four load values detected by the four load sensors 94a through 94d, the user can be at any position with respect to the four load sensors 94a through 94d of the board type controller 9. Namely, the user can play the game while being on the platform 9a at any position at any direction. However, depending on the type of the game, it may be identified to which positions of the board type controller 9 the loads of the load values detected by the four load sensors 94 have been applied, and it may also be identified in which direction the user has been oriented with respect to the board type controller 9, to perform the processing. In this case, the positional relationship between the board type controller 9 and the user can be estimated by use of the load values obtained from the four load sensors 94 of the board type controller 9 and the user direction can be used for a direction input to perform the processing.

However, when a direction input is made by use of the board type controller 9, it is preferable that the positional relationship between the board type controller 9 and the user is grasped as initial settings. In this case, for example, the positional relationship between the four load sensors 94 and the user may be defined in advance by initial settings, and the initial settings may be made with a precondition that the user gets on the platform 9a such that the predetermined positional relationship is obtained. Typically, a positional relationship with which two load sensors 94 are located forward to, two load sensors 94 are located rearward to, two load sensors 94 are located leftward to, and two load sensors 94 are located rightward to, the user who is at a center of the platform 9a, namely, a positional relationship with which the user is at a center of the platform 9a of the board type controller 9, is defined by initial settings. In this case, in this example, the platform 9a of the board type controller 9 is formed to be rectangular as viewed from above and the power button 9c is provided on one side thereof (longer side). It is ruled in advance that using the power button 9c as a guide, the user gets on the platform 9a for initial settings such that the longer side having the power button 9c is located in a predetermined direction (forward, rearward, left or right) with respect to the user. With such settings, the load values detected by the load sensors 94a through 94d in the initial settings are load values in the predetermined directions with respect to the user (right forward, left forward, right rearward and left rearward). Specifically, for the initial settings, the user gets on the platform 9a such that the longer side having the power button 9c extends from a left rearward position to a right rearward position as viewed from the user. In this case, the load values detected by the load sensors 94a through 94d in the initial settings are a load value at a position right rearward, a load value at a position left rearward, a load value at a position right forward, and a load value at a position left forward, with respect to the user. After the initial settings, a change of the user direction on the board type controller 9 is estimated using the load values obtained from the four load sensors 94a through 94d, and predetermined processing is performed using the user direction.

Figure 5:
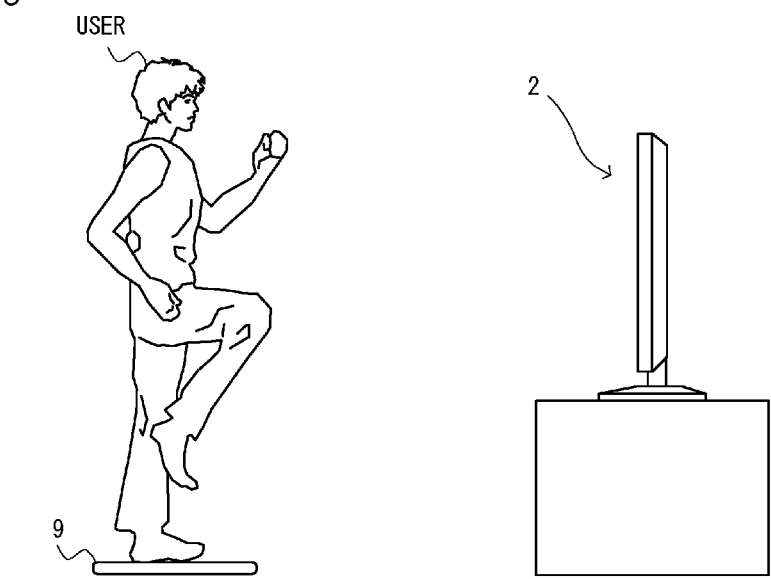
FIG. 5 shows a non-limiting example of how a user makes an operation using the board type controller 9 shown in FIG. 1.
Figure 6:
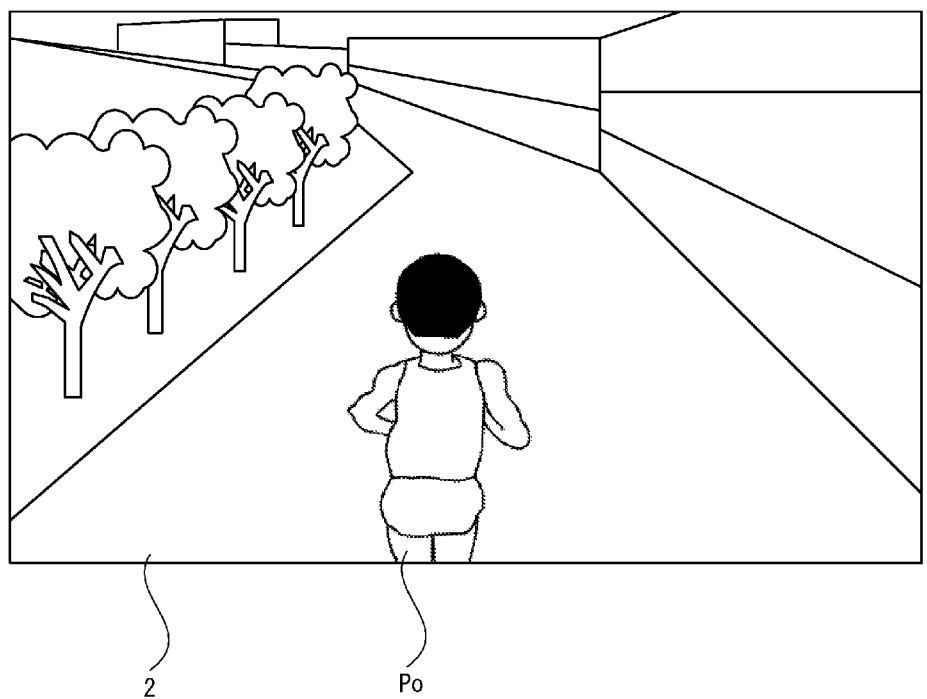
FIG. 6 shows a non-limiting example of an image displayed on a monitor 2 shown in FIG. 1.
Figure 7:
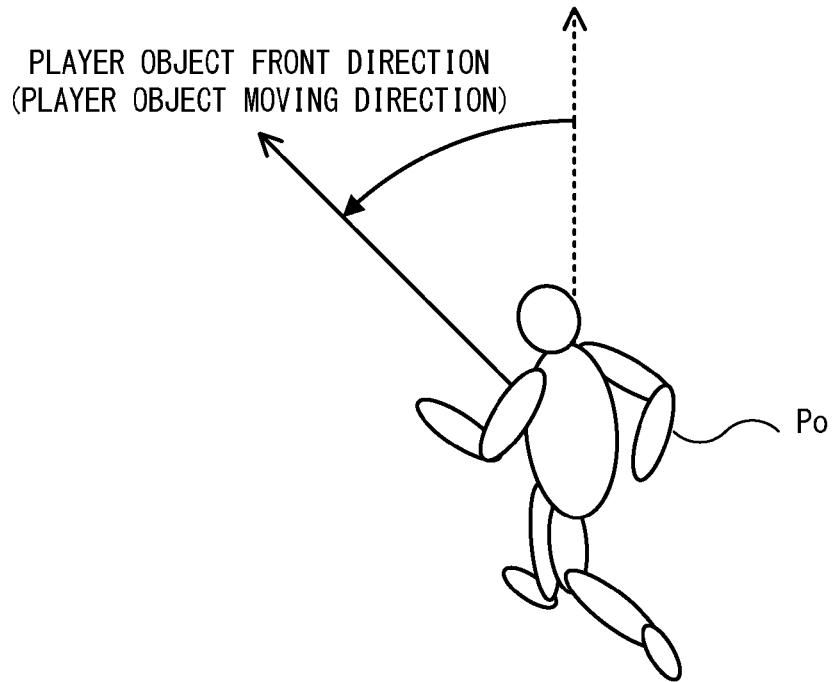
FIG. 7 shows a non-limiting example of how a player object front direction is changed when the user changes a direction of making a stepping action on the board type controller 9.
Figure 7:
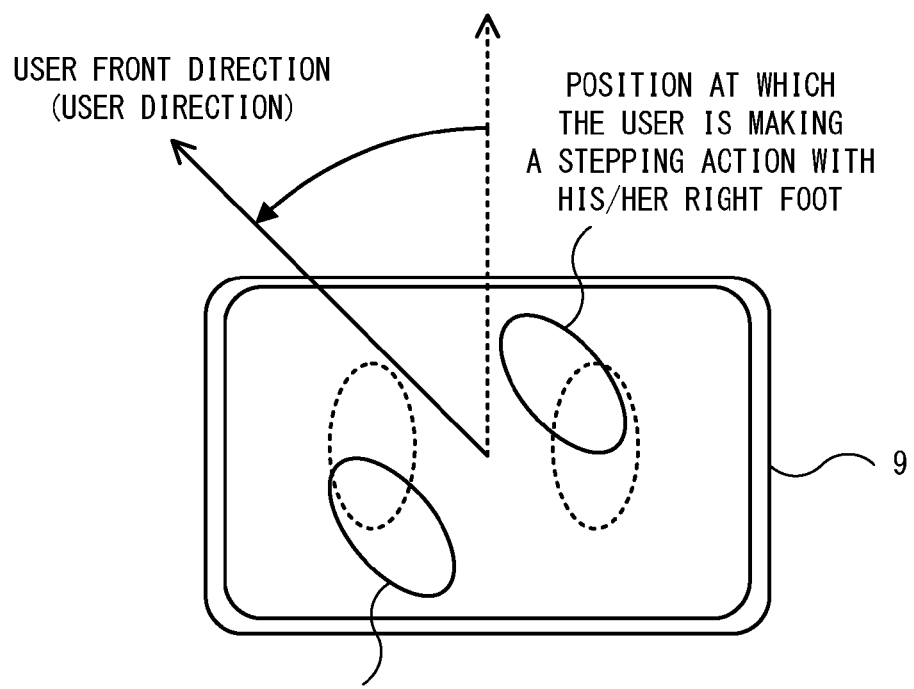
Figure 8:
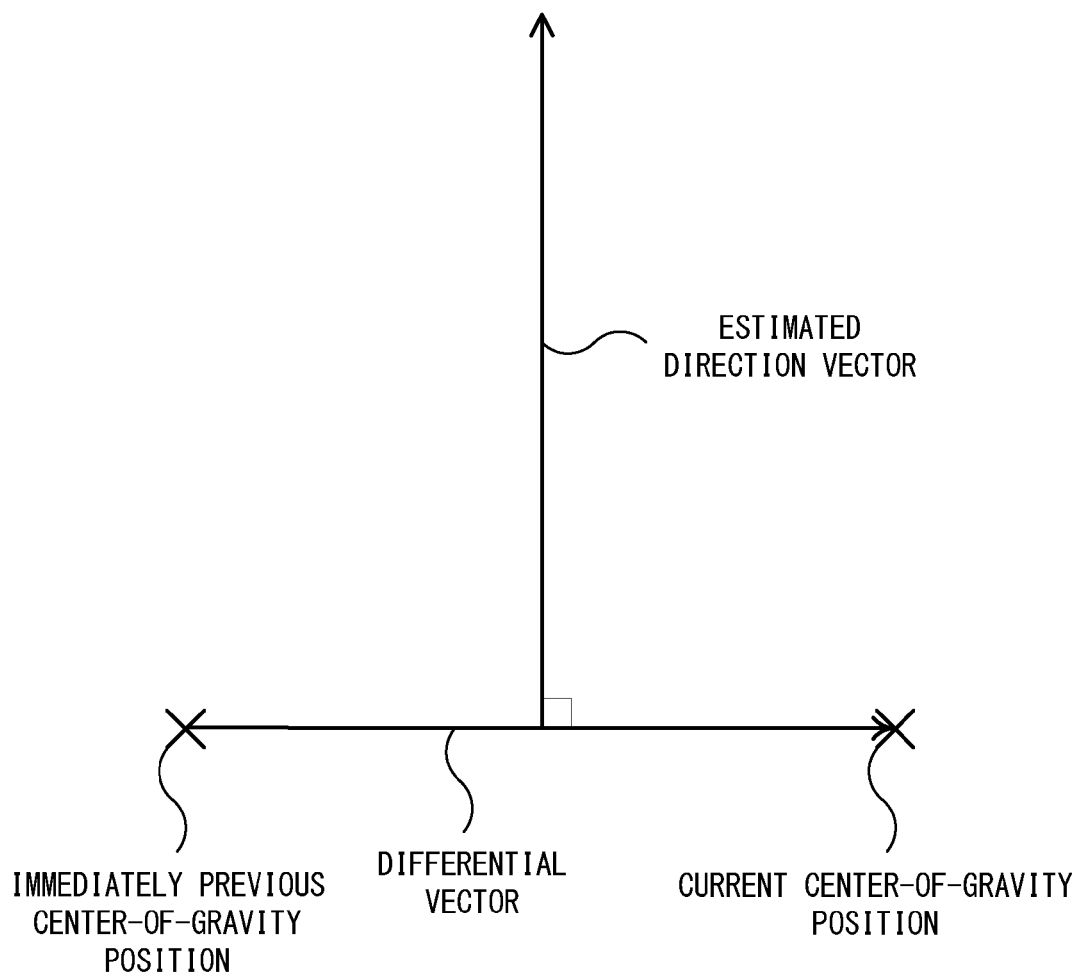
FIG. 8 shows a non-limiting example of how an estimated direction vector is calculated in accordance with a movement of a center-of-gravity position.
Figure 9:
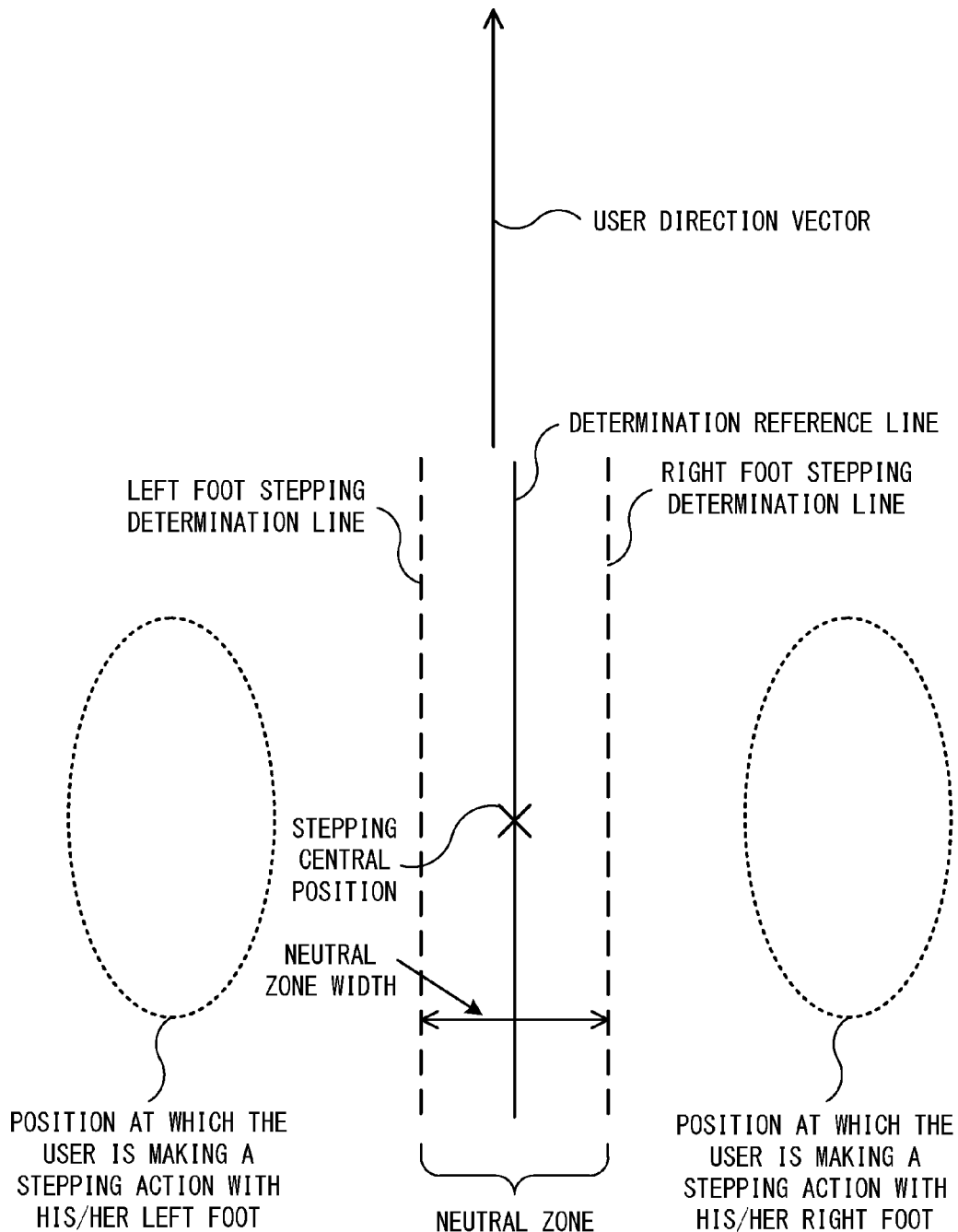
FIG. 9 shows a non-limiting example of stepping determination lines which are set in accordance with a calculated user front direction vector.

Now, before describing specific processing performed by the game apparatus main body 5, an overview of information processing performed by the game apparatus main body 5 will be described with reference to FIG. 5 through FIG. 9. FIG. 5 shows an example of how the user makes an operation using the board type controller 9. FIG. 6 shows an example of an image displayed on the monitor 2. FIG. 7 shows an example of how a player object front direction (moving direction) is changed when the user changes the direction of making a stepping action on the board type controller 9. FIG. 8 shows an example of how an estimated direction vector is calculated in accordance with a movement of a center-of-gravity position. FIG. 9 shows an example of stepping determination lines which are set in accordance with a calculated user front direction vector.

As shown in FIG. 5, the user makes an operation while being on the board type controller 9. The user plays by making an action (e.g., a stepping action, a bending and stretching action) on the board type controller 9 while watching an image displayed on the monitor and changing a front direction with respect to the user on the board type controller 9. (In this specification, when it is described that the user makes a "stepping action", it is meant that the user makes such an action on the spot, without going forward or backward.) The monitor 2 displays a game image in which a player object Po makes an action (e.g., an action of changing the moving direction or posture, or an action of changing the moving speed) in a virtual world in accordance with the front direction with respect to the user (user direction) on the board type controller 9 and the action of the user on the board type controller 9. For displaying such a game image, the position or direction of a virtual camera set in the virtual world is changed in accordance with the position or direction of the player object Po. For example, in FIG. 6, the player object Po that is walking, jogging, or running in the virtual world is displayed. The user makes a stepping action like walking, jogging or running on the board type controller 9. In this case, the player object Po moves in the virtual world at a speed in accordance with the stepping action of the user, and the moving direction of the player object Po in the virtual world is changed in accordance with the user direction on the board type controller 9.

For example, when the user makes an action of stepping on the board type controller 9, the player object Po moves in the virtual world while walking, jogging or running at a speed in accordance with the stepping action. When the user makes a bending and stretching action on the board type controller 9, the player object Po moves in the virtual world while jumping at a jumping ability in accordance with the bending and stretching action. Thus, the user can change the moving method or the moving speed of the player object Po by his/her action on the board type controller 9.

As described above, the board type controller 9 outputs a load detection value in accordance with the action of the user on the board type controller 9. Using the load detection value, a total load applied on the board type controller 9 or a center-of-gravity position of the load applied on the board type controller 9 can be calculated. Using a change of the total load or a change of the center-of-gravity position, it can be estimated what type of action is made by the user on the board type controller 9. In accordance with such an estimated action of the user on the board type controller 9, the moving method or the moving speed of the player object Po is set.

In accordance with the user direction on the board type controller 9, a direction of the player object Po in the virtual world (e.g., the front direction or the moving direction of the player object Po) is changed. For example, as shown in FIG. 7, when the user changes the direction of making a stepping action to the left on the board type controller 9 (namely, when the user direction is changed to the left), the direction in which the player object Po moves (front direction with respect to the player object Po) is changed to the left as seen from the player object Po. When the user changes the direction of making a stepping action to the right on the board type controller 9 (namely, when the user direction is changed to the right), the direction in which the player object Po moves is changed to the right as seen from the player object Po. In this manner, by associating the user direction on the board type controller 9 with the posture or the moving direction of the player object Po, the user can make a highly realistic operation while being on the board type controller 9 as if the user himself/herself was moving in the virtual world. The position or direction of the virtual camera for generating a virtual world image including the player object Po and displaying the virtual world image on the monitor 2 may be changed in accordance with a change of the posture or the moving direction of the player object Po (namely, in accordance with a change of the user direction on the board type controller 9) or may not be changed. In the former case, by associating the direction or position of the player object Po with the direction or position of the virtual camera, the user can also feel as if he/she was moving in the virtual world, via the monitor 2.

For estimating the user direction on the board type controller 9, an estimated direction vector which is calculated based on the action of the center of gravity of the load applied on the board type controller 9 is used. For example, as shown in FIG. 8, on a predetermined coordinate system corresponding to positions on the platform 9a of the board type controller 9 (e.g., an X1Y1 coordinate system in which the center of the platform 9a is the origin, the direction of the longer sides of the platform 9a is an X1 axis direction, and the direction of the shorter sides of the platform 9a is a Y1 axis direction), the estimated direction vector is set to extend in a direction which is vertical to a straight line connecting two center-of-gravity positions obtained at different timings (typically, two center-of-gravity positions successively obtained) and is parallel to the top surface of the board type controller 9 (e.g., horizontal direction) and is set to have a length equal to that of the straight line. Namely, the estimated direction vector is set to have a length equal to the moving amount of the center-of-gravity position and to be vertical to the moving direction of the center-of-gravity position. As the direction of the estimated direction vector, two directions, namely, a leftward horizontal direction and a rightward horizontal direction with respect to the moving direction are conceivable. As is made clear later, as the direction of the estimated direction vector, either one of the two directions which is closer to a user direction vector that is set in processing described later is selected. The user direction is estimated by the user direction vector which is calculated by adding a predetermined number (e.g., 30 frames) of the estimated direction vectors set as described above. Specifically, the user direction vector is calculated by adding the predetermined number of the estimated direction vectors in the time-series order of being obtained and normalizing the addition result, and the direction of the user direction vector is estimated as the user direction at the current time on the board type controller.

Also for making a determination on the stepping action of the user on the board type controller 9, the center-of-gravity position is used. For example, a zone in which the center-of-gravity position moves when the user raises his/her left leg and lowers his/her right leg during the stepping action (right foot zone), and a zone in which the center-of-gravity position moves when the user raises his/her right leg and lowers his/her left leg during the stepping action (left foot zone), are set on the coordinate system. When, for example, the user makes a stepping action on the board type controller 9 in the state where the longer side thereof having the power button 9c is rearward to the user, the left foot zone and the right foot zone are respectively set in a left area and a right area of the platform 9a (e.g., a left area and a right area with the power button 9c being rearward to the user). A neutral zone having a predetermined width and extending in front-rear directions with respect to the user is set between the left foot zone and the right foot zone. When the center-of-gravity position moves from the neutral zone to the right foot zone, it is determined that the user has raised his/her left leg; and when the center-of-gravity position moves from the neutral zone to the left foot zone, it is determined that the user has raised his/her right leg.

It is conceivable that the user makes a stepping action while changing the direction of his/her body on the board type controller 9. In this case, as shown in FIG. 9, for making a determination on the stepping action of the user on the board type controller 9 also, the user direction vector is used. If the positions of the left foot zone, the right foot zone and the neutral zone are fixed, when the user changes the direction of his/her body on the board type controller 9, an accurate determination on the stepping action cannot be made. In such a case, the left foot zone, the right foot zone and the neutral zone on the coordinate system may be moved based on the user direction vector which is calculated using the movement of the center-of-gravity position on the coordinate system. For example, the direction in which the neutral zone extends is changed to the direction of the user direction vector, and the neutral zone is moved such that the central position of the neutral zone matches the central position of the stepping action of the user. In accordance with the movement of the neutral zone, the left foot zone and the right foot zone are moved. By moving the left foot zone, the right foot zone and the neutral zone in this manner, even if the user makes a stepping action while changing the direction of his/her body on the board type controller 9, an accurate determination on the stepping action can be made.

Figure 10:
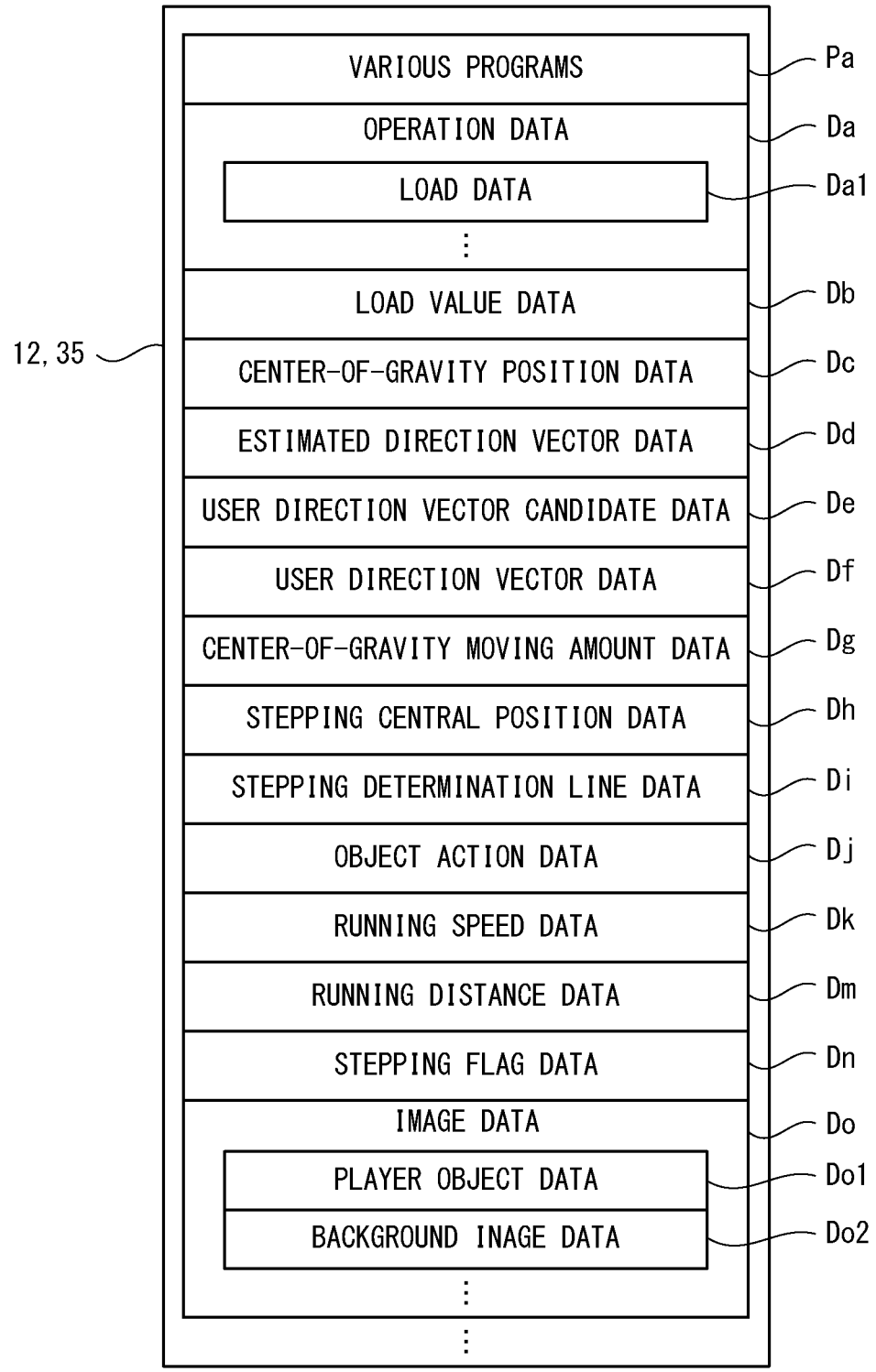
FIG. 10 shows a non-limiting example of main data and programs stored on a main memory of the game apparatus main body 5 shown in FIG. 1.

Now, information processing performed by the game system 1 will be described in detail. First, with reference to FIG. 10, main data used in the information processing will be described. FIG. 10 shows an example of main data and programs stored on the external main memory 12 and/or the internal main memory 35 (hereinafter, these two memories will be collectively referred to simply as the "main memory") of the game apparatus main body 5.

As shown in FIG. 10, a data storage area of the main memory has stored therein operation data Da, load value data Db, center-of-gravity position data Dc, estimated direction vector data Dd, user direction vector candidate data De, user direction vector data Df, center-of-gravity moving amount data Dg, stepping central position data Dh, stepping determination line data Di, object action data Dj, running speed data Dk, running distance data Dm, stepping flag data Dn, image data Do and the like. The main memory optionally has stored thereon data used for the processing and the like, for example, data regarding other objects and the like displayed on the monitor 2, in addition to the data included in the information shown in FIG. 10. In a program storage area of the main memory, a program group Pa including various types of programs forming an information processing program is stored.

The operation data Da includes a series of operation information transmitted from the controller 7 or the board type controller 9 as transmission data, and such operation information is updated into latest operation data. For example, the operation data Da includes load data Da1 and the like. The load data Da1 represents load detection values respectively detected by the load sensors 94a through 94d of the board type controller 9.

The wireless controller module 19 included in the game apparatus main body 5 receives data (e.g., data representing the load detection values) included in the operation information transmitted from the controller 7 or the board type controller 9 at a predetermined cycle (e.g., every 1/200 seconds), and stores the data in a buffer (not shown) included in the wireless controller module 19. Then, the data stored in the buffer is read every frame, which is a processing cycle (e.g., every 1/60 seconds), and thus the operation data Da (e.g., load data Da1) in the main memory is updated.

In this process, the cycle of receiving the operation information and the processing cycle are different from each other. Therefore, the operation information received at a plurality of timings is described in the buffer. In the description given later regarding the processing, it is assumed that among the operation information received at a plurality of timings, only the latest operation information is used for the processing in each of steps and the processing is advanced to the next step.

In the processing flows described later, the load data Da1 is updated every frame, which is the processing cycle, for example. Alternatively, the load data Da1 may be updated at a different processing cycle. For example, the load data Da1 may be updated at a cycle of transmission from the board type controller 9, and the updated load data Da1 may be used every processing cycle. In this case, the cycle of updating the load data Da1 is different from other processing cycles.

The load value data Db is an aggregate of data each representing a load value detected by the board type controller 9. For example, the load value data Db is an aggregate of data each representing a total value (total load value) of the load values respectively detected by the load sensors 94a through 94d. Specifically, the load value data Db is an array of data each representing the total of load values of a predetermined time period (e.g., of 30 frames) calculated in a time series manner. In each of elements of the array, data representing the total load value is stored in a time series manner.

The center-of-gravity position data Dc is an aggregate of data each representing a center-of-gravity position of the load applied on the board type controller 9. For example, the center-of-gravity position data Dc is an aggregate of data each representing a center-of-gravity position which is calculated based on the load values respectively detected by the load sensors 94a through 94d using a predetermined mathematical expression. Specifically, the center-of-gravity position data Dc is an array of data each representing the center-of-gravity position of a predetermined time period (e.g., of at least 31 frames) calculated in a time series manner. In each of elements of the array, data representing the center-of-gravity position is stored in a time series manner.

The estimated direction vector data Dd is an aggregate of data each representing an estimated direction vector (see FIG. 8) which is set based on the action of the center-of-gravity position. For example, the estimated direction vector data Dd is an aggregate of data each representing an estimated direction vector which is calculated in repetition using the center-of-gravity position calculated by immediately previous processing and the center-of-gravity position calculated by the current processing which is successive from the immediately previous processing in a time series. Specifically, the estimated direction vector data Dd is an array of data each representing the estimated direction vector of a predetermined time period (e.g., of 30 frames) calculated in a time series manner. In each of elements of the array, data representing the estimated detection vector is stored in a time series manner.

The user direction vector candidate data De represents a user direction vector candidate obtained by adding the estimated direction vectors obtained in a predetermined time period (e.g., 30 frames) from the current time and normalizing the addition result.

The user direction vector data Df represents a user direction vector representing an estimated user direction on the board type controller 9. As is made clear later, the direction of the user direction vector is updated each time the direction is made closer to the direction of the user direction vector candidate based on a predetermined condition.

The center-of-gravity moving amount data Dg represents the center-of-gravity moving amount, which indicates the moving amount of the center-of-gravity position in a predetermined time period.

The stepping central position data Dh represents a stepping central position of the user who is making a stepping action on the board type controller 9. The stepping determination line data Di represents each of determination lines (determination reference line, left foot stepping determination line, right foot stepping determination line) which are calculated based on the user direction vector and the stepping central position and used for making a determination on the stepping action of the user.

The object action data Dj represents an action, a position and a direction of the player object Po in the virtual world. The running speed data Dk represents a speed of the player object Po running (walking) in the virtual world. The running distance data Dm represents a distance by which the player object Po has run (walked) in the virtual world.

The stepping flag data Dn represents a stepping flag, which is set on when the user makes an action of raising his/her left leg and putting his/her right leg on the board type controller 9 and is set off when the user makes an action of raising his/her right leg and putting his/her left leg on the board type controller 9.

The image data Do includes player object data Do1, background image data Do2 and the like. The player object data Do1 is data for locating the player object Po in the virtual world to generate a game image. The background image data Do2 is data for locating a background in the virtual world to generate a game image.

Figure 11:
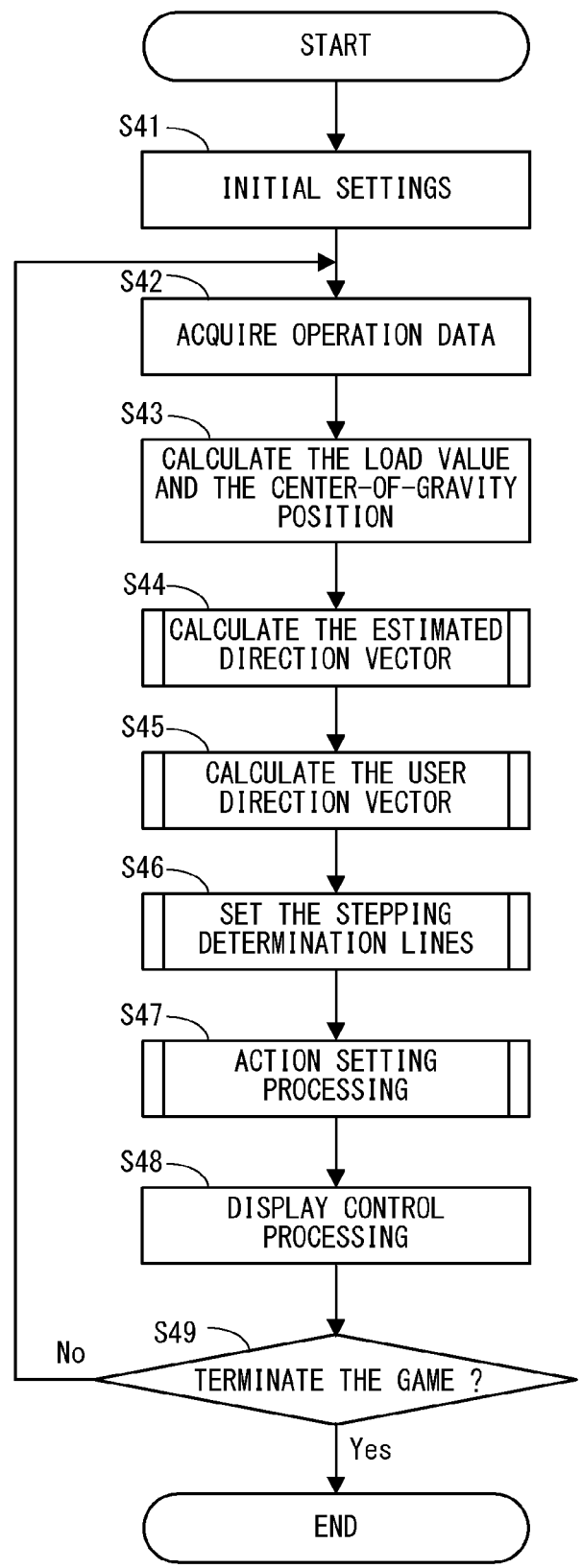
FIG. 11 is a flowchart showing a non-limiting example of processing executed by the game apparatus main body 5 shown in FIG. 1.
Figure 12:
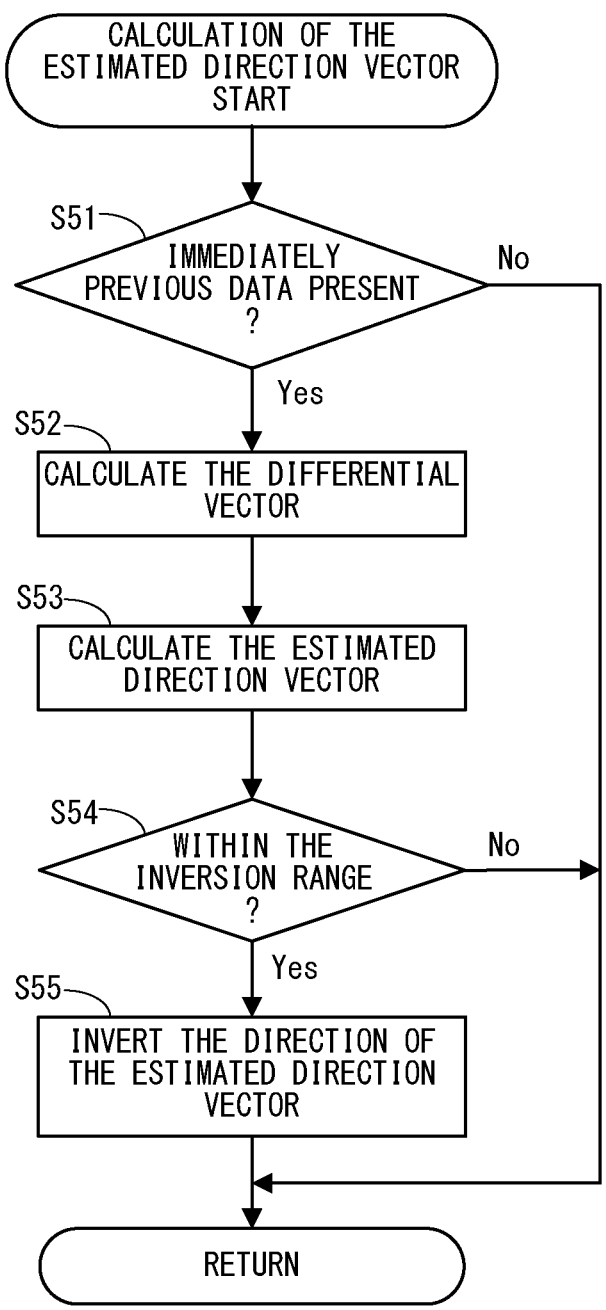
FIG. 12 is a flowchart of a subroutine showing a non-limiting example of processing of calculating the estimated direction vector in step 44 shown in FIG. 11.
Figure 13:
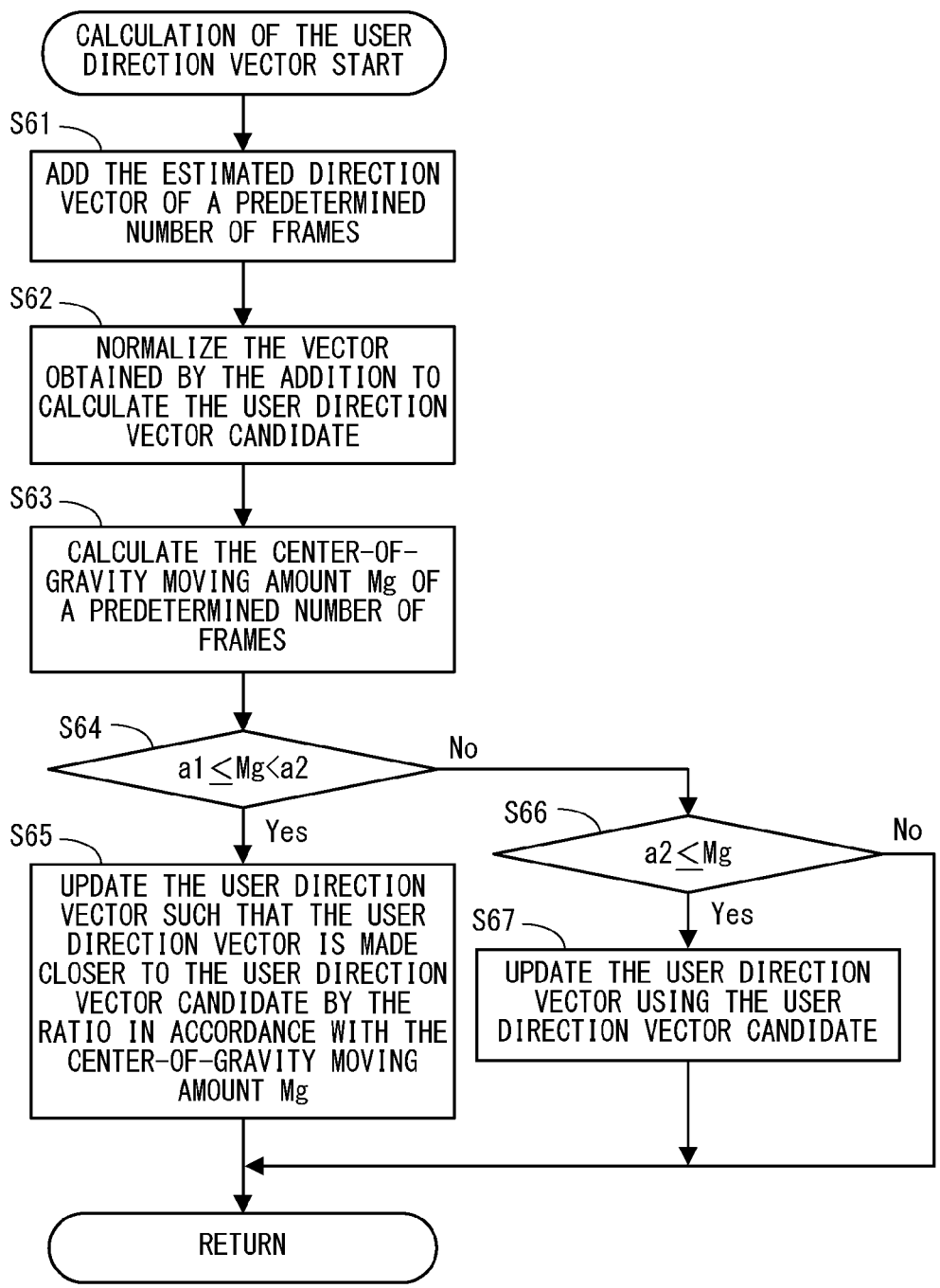
FIG. 13 is a flowchart of a subroutine showing a non-limiting example of processing of calculating a user direction vector in step 45 shown in FIG. 11.

Now, with reference to FIG. 11 through FIG. 16, information processing performed by the game apparatus main body 5 will be described in detail. FIG. 11 is a flowchart showing an example of information processing executed by the game apparatus main body 5. FIG. 12 is a flowchart of a subroutine showing an example of processing of calculating the estimated direction vector in step 44 shown in FIG. 11. FIG. 13 is a flowchart of a subroutine showing an example of processing of calculating the user direction vector in step 45 shown in FIG. 11.

Figure 14:
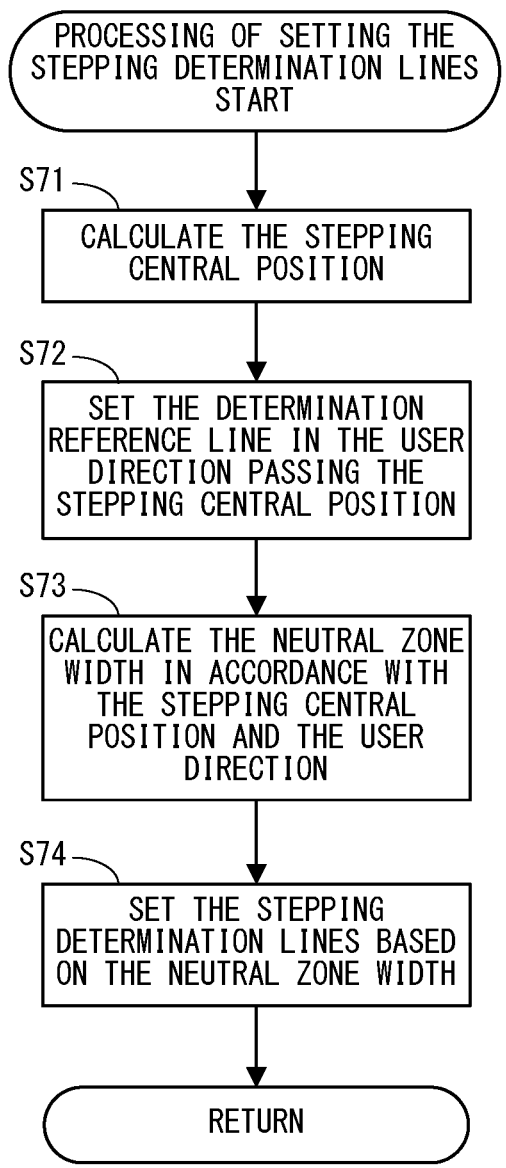
FIG. 14 is a flowchart of a subroutine showing a non-limiting example of processing of setting stepping determination lines in step 46 shown in FIG. 11.
Figure 15:
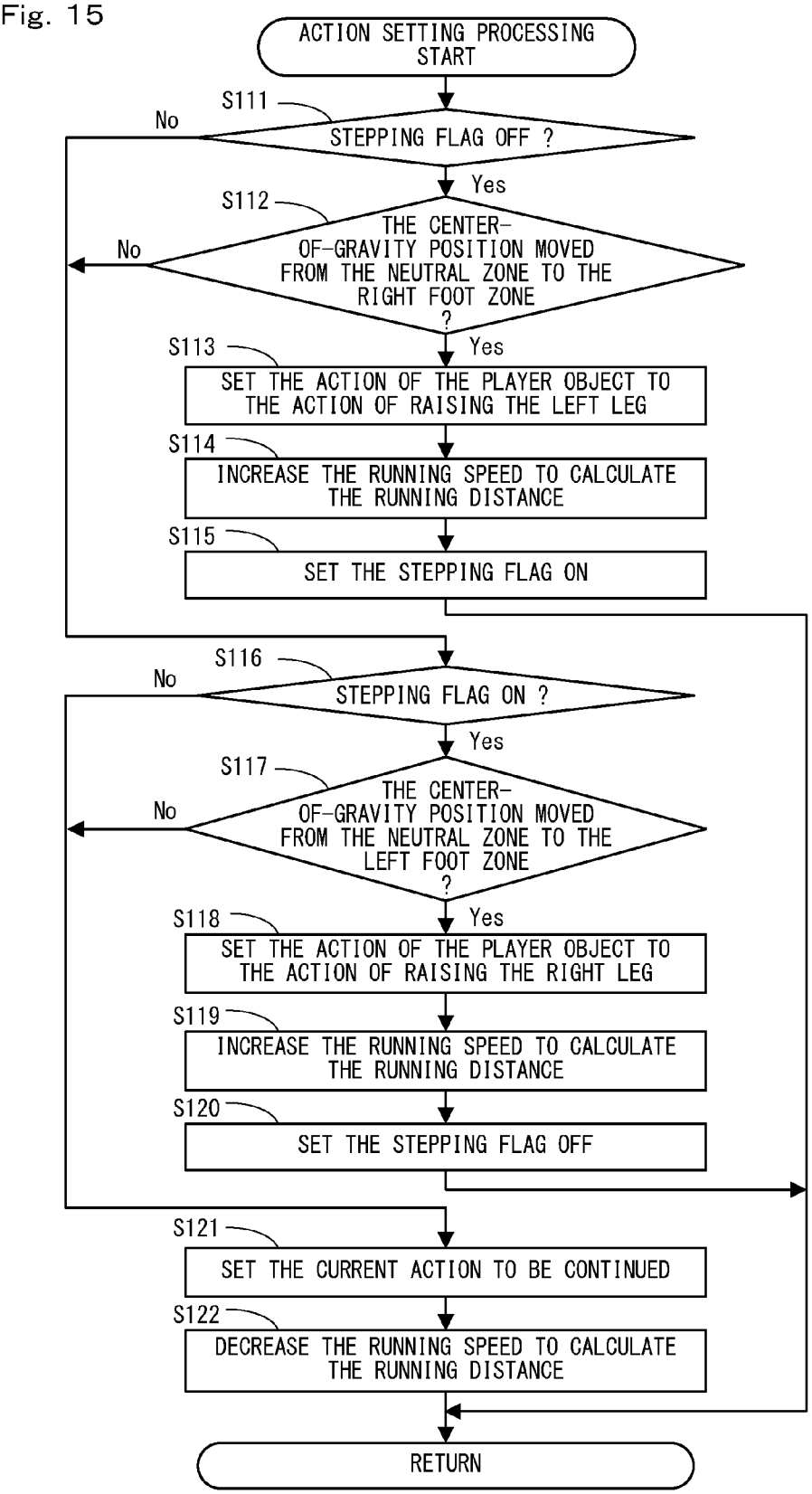
FIG. 15 is a flowchart of a subroutine showing a non-limiting example of action setting processing in step 47 shown in FIG. 11.
Figure 16:
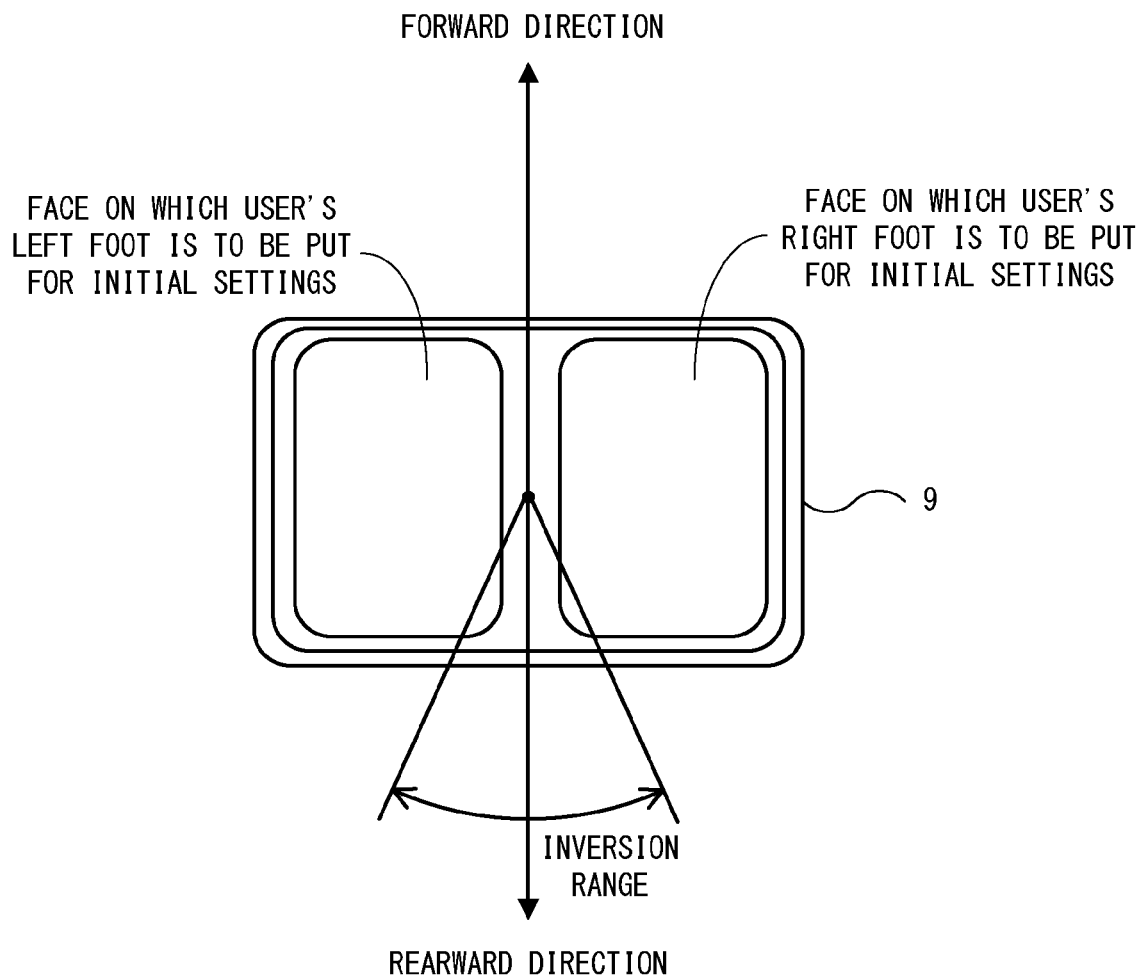
FIG. 16 shows a non-limiting example of an inversion range in which a direction of the estimated direction vector can be inverted.

FIG. 14 is a flowchart of a subroutine showing an example of processing of setting the stepping determination lines in step 46 shown in FIG. 11. FIG. 15 is a flowchart of a subroutine showing an example of action setting processing in step 47 shown in FIG. 11. FIG. 16 shows an example of an inversion range in which the direction of the estimated direction vector can be inverted. The description which will be made with reference to the flowcharts in FIG. 11 through FIG. 15 is regarding processing of causing the player object Po to make an action and displaying such an action of the player object Po in accordance with an operation made by the user by use of the board type controller 9, among various type of information processing. Detailed descriptions of other types of processing which are not directly relevant to the example embodiment will be omitted. In FIG. 11 through FIG. 15, each of the steps executed by the CPU 10 will be simply referred to as "S".

When the game apparatus main body 5 is powered on, the CPU 10 of the game apparatus main body 5 executes a boot program stored on the ROM/RTC 13 to initialize each of units such as the main memory and the like. An information processing program stored on the optical disc 4 is loaded onto the main memory and the CPU 10 starts to execute the program. The flowcharts in FIG. 11 through FIG. 15 show the processing performed after such processing is finished.

Referring to FIG. 11, the CPU 10 performs initial settings for the processing (step 41) and proceeds to the next step. For example, as the initial settings in step 41, the CPU 10 sets the virtual world, performs initial settings on the location, the direction and the like of the player object Po, and updates the object action data Dj and the like. Also as the initial settings in step 41, the CPU 10 uses an image displayed on the monitor 2 or the sound output from the speaker to urge the user to get on the board type controller 9 such that the forward direction with respect to the board type controller 9 (e.g., direction with which the side having the power button 9c in FIG. 3 is the rear side; i.e., the direction from the rear side toward the forward side facing the rear side) is the front direction with respect to the user. The CPU 10 sets the user direction vector to the forward direction with respect to the board type controller 9 and updates the user direction vector data Df. Also as the initial settings in step 41, the CPU 10 initializes other parameters for performing the following information processing. For example, the CPU 10 initializes the other parameters represented by the above-mentioned data stored on the main memory to respective predetermined values (e.g., 0, no value, Null value).

Next, the CPU 10 acquires the operation data (step 42) and proceeds to the next step. For example, the CPU 10 uses the data which is included in the operation data received from the board type controller 9 and represents the load detection values, to update the load value data Da1. The operation data includes the data representing the load detection values respectively detected by the load sensors 94a through 94d. The load data Da1 is updated using the data distinguished by the identification information on the load sensors 94a through 94d. Since the cycle of receiving the operation data is different from the cycle of performing the processing in step 42, the operation data obtained at a plurality of timings are received during the processing cycle and stored in the buffer. In step 42, only the latest operation data among the operation data received at a plurality of timings is used to update the operation data Da, for example.

Next, the CPU 10 calculates a load value and a center-of-gravity position (step 43) and proceeds to the next step. For example, the CPU 10 adds the load detection values represented by the load data Da1 to calculate a total load value, and uses the data representing the total load value to update the latest data in the time-series data array of the load value data Db. Specifically, since the load data Da1 represents the latest load detection values respectively detected by the load sensors 94a through 94d, the total load value is calculated by adding such latest load detection values. The CPU 10 calculates a center-of-gravity position using the load detection values represented by the load data Da1, and uses the data representing the center-of-gravity position to update the latest data in the time-series data array of the center-of-gravity position data Dc. Hereinafter, an example of a method for calculating the center-of-gravity position will be described.

The center-of-gravity position is a center-of-gravity position of a load applied on the platform 9a of the board type controller 9, and is defined by the load values respectively detected by the load sensors 94a through 94d (see FIG. 3). For example, the center-of-gravity position is represented by coordinate values based on a predetermined coordinate system corresponding to positions on the platform 9a of the board type controller 9 (e.g., an XY coordinate system in which the center of the platform 9a is the origin, the direction of the longer sides of the platform 9a is an X axis direction, and the direction of the shorter sides of the platform 9a is a Y axis direction). Where the load value detected by the load sensor 94a is a, the load value detected by the load sensor 94b is b, the load value detected by the load sensor 94c is c, and the load value detected by the load sensor 94d is d, an X axis coordinate value (X) and a Y axis coordinate value (Y) of the center of gravity can be calculated using the following mathematical expressions.

$$X=((a+c)-(b+d))\times m$$

$$Y=((c+d)-(a+b))\times n$$

In the expressions, m and n are predefined constants. The center-of-gravity position calculated in this manner varies in accordance with the action or a weight shift (posture) of the user on the board type controller 9. For example, when the user raises his/her left leg, the X axis coordinate value of the center-of-gravity position obtains a positive value; and when the user raises his/her right leg, the X axis coordinate value of the center-of-gravity position obtains a negative value. The above-described method for calculating the center-of-gravity position is merely an example, and the center-of-gravity position may be calculated in any other method.

Next, the CPU 10 calculates an estimated direction vector (step 44) and proceeds to the next step. Hereinafter, with reference to FIG. 12, the processing of calculating an estimated direction vector performed in step 44 will be described.

Referring to FIG. 12, the CPU 10 determines whether or not the center-of-gravity position has been calculated in the immediately previous processing (step 51). For example, the CPU 10 refers to the center-of-gravity position data Dc to determine whether or not the center-of-gravity position has been calculated in step 43 in the immediately previous loop of processing. When the center of gravity has been calculated in the immediately previous processing, the CPU 10 proceeds to next step, i.e., step 52. By contrast, when the center of gravity has not been calculated in the immediately previous processing, the CPU 10 terminates the processing by this subroutine.

In step 52, the CPU 10 calculates a differential vector and proceeds to the next step. For example, the CPU 10 calculates a differential vector on the above-described coordinate system from the center-of-gravity position calculated in the immediately previous loop of processing to the center-of-gravity position calculated in the current loop of processing.

Next, the CPU 10 calculates an estimated direction vector using the differential vector (step 53) and proceeds to the next step. For example, the CPU 10 calculates a vector, extending in a direction perpendicular to the differential vector calculated in step 52 and having a length same as that of the differential vector on the above-described coordinate system, as the estimated direction vector. As the direction perpendicular to the differential vector, a pair of, i.e., two, directions are conceivable. Among these two directions, a direction closer to the direction of the user direction vector represented by the user direction vector data Df on the above-described coordinate system is selected by the CPU 10 as the estimated direction vector. The CPU 10 uses the data representing the calculated estimated direction vector to update the latest data in the time-series data array of the estimated direction vector data Dd.

Next, the CPU 10 determines whether or not the estimated direction vector calculated in step 53 is present within an inversion range (step 54). For example, as shown in FIG. 16, the inversion range in which the direction of the estimated direction vector can be inverted is set in an area including the direction rearward to the board type controller 9 (e.g., a range between a direction that is 15 degrees leftward with respect to the rearward direction and a direction that is 15 degrees rightward with respect to the rearward direction). When the estimated direction vector is present within the inversion range, the CPU 10 proceeds to the next step, i.e., step 55. By contrast, when the estimated direction vector is not present within the inversion range, the CPU 10 terminates the processing by this subroutine.

In step 55, the CPU 10 inverts the direction of the estimated direction vector calculated in step 53, and uses the inverted estimated direction vector to update the latest data in the time-series data array of the estimated direction vector data Dd. Then, the CPU 10 terminates the processing by this subroutine. The inversion range is provided in an area including the direction rearward to the board type controller 9 because it is assumed that the basic play posture is the posture of the user playing when watching the monitor 2 and that the forward direction with respect to the board type controller 9 is generally the direction toward the monitor 2. It is unlikely that the user assumes a play posture of being oriented in the rearward direction with respect to the board type controller 9 with the monitor 2 being on his/her back. Therefore, when the direction of the estimated direction vector is set to the rearward direction with respect to the board type controller 9, such a direction is inverted to an area including the forward direction with respect to the board type controller 9. Thus, the precision of the determination on the user direction can be improved. In the case where such an effect is not expected, the processing of inverting the direction of the estimated direction vector does not need to be performed. In this case, the estimated direction vector can be set to any direction and the user direction can be set to any direction with no weighting. Therefore, the user himself/herself can be oriented to any direction freely.

Referring back to FIG. 11, after the processing of calculating the estimated direction vector in step 44, the CPU 10 calculates a user direction vector and proceeds to the next step (step 45). Hereinafter, with reference to FIG. 13, the processing of calculating a user direction vector performed in step 45 will be described.

Referring to FIG. 13, the CPU 10 adds the estimated direction vectors of a predetermined number of frames (step 61) and proceeds to the next step. For example, the CPU 10 acquires the data of a latest predetermined number of frames (e.g., 30 frames) in the time-series data array stored in the estimated direction vector data Dd, and adds the estimated direction vectors represented by such data to calculate one vector. In the case where the number of pieces of data in the time-series data array stored in the estimated direction vector data Dd is less than the predetermined number of frames, the estimated direction vectors represented by the data in the time-series data array may be added to calculate one vector.

Next, the CPU 10 normalizes the vector calculated in step 61 to calculate a user direction vector candidate (step 62) and proceeds to the next step. For example, the CPU 10 normalizes the vector calculated in step 61 to length 1 to calculate a user direction vector candidate, and uses the user direction vector candidate to update the user direction vector candidate data De. The direction of the user direction vector candidate is a vector direction obtained by adding the estimated direction vectors of a predetermined number of frames. Since the length of each estimated direction vector is set based on the moving amount of the center-of-gravity position as described above, the direction of the user direction vector candidate is a direction obtained as a result of weighting performed with the moving amount of the center-of-gravity position.

Next, the CPU 10 calculates a center-of-gravity moving amount Mg of a predetermined number of frames (e.g., 30 frames) (step 63) and proceeds to the next step. For example, the CPU 10 acquires the center-of-gravity positions of the latest frames of a number obtained by adding one to a predetermined number for calculating the center-of-gravity moving amount Mg (e.g., the latest 31 frames) in the time-series data array stored in the center-of-gravity position data Dc. The CPU 10 accumulates moving distances between the center-of-gravity positions acquired successively by the predetermined number of frames to calculate a center-of-gravity moving amount Mg, and uses the calculated center-of-gravity moving amount Mg to update the center-of-gravity moving amount data Dg. In the case where the number of pieces of data in the time-series data array stored in the center-of-gravity position data Dc is less than the number obtained by adding one to the predetermined number of frames, the center-of-gravity moving amount Mg may be calculated by acquiring the center-of-gravity positions represented by the data in the time-series data array and accumulating the moving distances between the center-of-gravity positions.

Next, the CPU 10 determines whether or not the center-of-gravity moving amount Mg is in the range of not less than threshold value a1 and less than threshold value 2 (step 64). When the center-of-gravity moving amount Mg is in the range of not less than threshold value a1 and less than threshold value 2, the CPU 10 proceeds to the next step, i.e., step 65. By contrast, when the center-of-gravity moving amount Mg is not in the range of not less than threshold value a1 and less than threshold value 2, the CPU 10 proceeds to the next step, i.e., step 66. In this process, a1<s2. In the case where, for example, the longer sides of the board type controller 9 each have length 2, threshold value 1 is set to 0.75 and threshold value 2 is set to 1.00.

In step 65, the CPU 10 updates the user direction vector such that the direction of the user direction vector is made closer to the direction of the user direction vector candidate by a ratio of P % which is determined by the center-of-gravity moving amount Mg, and terminates the processing by this subroutine. In the case where, for example, the longer sides of the board type controller 9 each have length 2, the CPU 10 calculates the ratio P by:

$$P=\{(Mg-a1)/(a2-a1)\}*100.$$

Specifically, in the case where the longer sides of the board type controller 9 each have length 2, the ratio P is:

$$P=\{(Mg-0.75)/0.25\}*100.$$

The CPU 10 refers to the user direction vector candidate data De and the user direction vector data Df to change the direction of the user direction vector such that the direction of the user direction vector is made closer to the direction of the user direction vector candidate by the ratio of P %, and uses the changed user direction vector to update the user direction vector data Df.

By contrast, in step 66, the CPU 10 determines whether or not the center-of-gravity moving amount Mg is in the range of not less than threshold value a2. When the center-of-gravity moving amount Mg is in the range of not less than threshold value a2, the CPU 10 proceeds to the next step, i.e., step 67. By contrast, when the center-of-gravity moving amount Mg is less than threshold value a1, the CPU 10 terminates the processing by this subroutine without changing the user direction vector.

In step 67, the CPU 10 sets the user direction vector candidate as it is as the user direction vector to update the user direction vector data Df, and terminates the processing by this subroutine.

In the above-described processing, the ratio by which the user direction vector is made closer to the user direction vector candidate is changed in accordance with the center-of-gravity moving amount Mg, for example. The ratio is changed as described above because the user direction is estimated utilizing a characteristic that when the user makes a stepping action, the center-of-gravity position is moved to the left or to the right of the user. The ratio is changed as described above in order to estimate the user direction more accurately by performing weighting of changing the user direction when the moving amount of the center-of-gravity position is large. Accordingly, the ratio may be changed in accordance with any other parameter which allows such weighting to be done. For example, in step 61, the ratio may be changed in accordance with the length of one vector obtained by adding the estimated direction vectors of a predetermined number of frames. The length of the estimated direction vector obtained by the addition is set based on the moving amount of the center-of-gravity position, and therefore the length of the vector can be treated as a parameter which allows the weighting to be done based on the moving amount of the center of gravity.

The ratio by which the user direction vector is made closer to the user direction vector candidate may be selected from 0% and 100%. For example, when the center-of-gravity moving amount Mg is less than a predetermined threshold value (e.g., threshold value a1, threshold value a2, or any other value therebetween), the ratio is set to 0%. Namely, because the user direction vector is not made closer to the user direction vector candidate, the user direction vector is set as it is. When the center-of-gravity moving amount Mg is not less than the predetermined threshold value, the ratio is set to 100%. Namely, the user direction vector candidate, as it is, is set as the user direction vector.

Referring back to FIG. 11, after the processing of calculating the user direction vector in step 45, the CPU 10 performs processing of setting stepping determination lines (step 46) and proceeds to the next step. Hereinafter, with reference to FIG. 14, the processing of setting stepping determination lines performed in step 46 will be described.

Referring to FIG. 14, the CPU 10 calculates a stepping central position (step 71) and proceeds to the next step. For example, the CPU 10 calculates a stepping central position (MX1, MY1) on the above-described coordinate system (X1, Y1) by:

$$MX1=(b2*MX1a+GX1)/b1$$

$$MY1=(b2*MY1a+GY1)/b1,$$

and uses the calculated stepping central position (MX1, MY1) to update the stepping central position data Dh. In the expressions, MX1$a$ and MY1$a$ represent the X1 coordinate value and the Y1 coordinate value of the stepping central position calculated by the immediately previous processing. GX1 and GY1 represent the X1 coordinate value and the Y1 coordinate value of the latest center-of-gravity position calculated in step 43. b1 and b2 are predefined constants, and are set as b1=180 and b2=b1−1=179. As is clear from the above mathematical expressions, the stepping central position (MX1, MY1) calculated based on the mathematical expressions is changed so as to follow the center-of-gravity position of the latest load applied on the board type controller 9 at a predetermined ratio (b2/b1). By calculating the position which follows the center-of-gravity position at a predetermined ratio in this manner, the stepping central position of the user making a stepping action on the board type controller 9 can be formed.

The stepping central position may be found by any other method. For example, a position found by averaging the center-of-gravity positions obtained during an immediately previous predetermined time period may be set as the stepping central position. The stepping central position of the user making a stepping action on the board type controller 9 can be found also using a position found by averaging the center-of-gravity positions during a predetermined time period in this manner.

The stepping central position is provided for estimating an intermediate point between the position at which the user puts his/her left foot and the position at which the user puts his/her right foot when making a stepping action. Namely, the stepping central position may be defined as a position provided for estimating a position at which a straight line extending vertically from the center of the body (center of gravity of the body) of the user on the board type controller 9 intersects the platform 9a of the board type controller 9. The stepping central position may be found by any other method based on such a definition.

Next, the CPU 10 sets a determination reference line in the user direction passing the stepping central position (step 72) and proceeds to the next step. For example, the CPU 10 refers to the user direction vector data Df and the stepping central position data Dh to acquire the user direction vector and the stepping central position at the current time and sets a determination reference line (see FIG. 9) passing the stepping central position and extending in the direction of the user direction vector (user direction) on the above-described coordinate system. The CPU 10 uses the set determination reference line to update the data representing the determination reference line included in the stepping determination reference line data Di.

Next, the CPU 10 calculates a neutral zone width in accordance with the stepping central position and the user direction (step 73) and proceeds to the next step. For example, the CPU 10 sets the neutral zone width to be smaller as a smaller angle, among the angles made by a straight line in the user direction (direction of the user direction vector) and a straight line in the forward direction with respect to the board type controller 9, is larger. The CPU 10 sets the neutral zone width to be smaller as the stepping central position is farther from the center of the platform 9a of the board type controller 9 (namely, farther from the origin of the coordinate system). For example, the size of the platform 9a of the board type controller 9 is finite and so it may be difficult to make a stepping action at an edge of the platform 9a. Even in such a case, by setting the neutral zone width to be small, the determination on the stepping action can be accurately made.

Next, the CPU 10 sets a left foot stepping determination line and a right foot stepping determination line based on the neutral zone width (step 74) and terminates the processing by this subroutine. For example, the CPU 10 sets a left foot stepping determination line and a right foot stepping determination line which are provided to both of two sides of, and parallel to, the determination reference line while having the determination reference line at the center therebetween. The CPU 10 sets the left foot stepping determination line (FIG. 9) to the left of the determination reference line with respect to the user direction and sets the right foot stepping determination line to the right of the determination reference line with respect to the user direction, such that the gap therebetween has a width equal to the neutral zone width. The CPU 10 uses the set left foot stepping determination line and right foot stepping determination line to update the data representing the left foot stepping determination line and the right foot stepping determination line included in the stepping determination line data Di.

Referring back to FIG. 11, after the processing of setting the stepping determination lines in step 46, the CPU 10 performs action setting processing (step 47) and proceeds to the next step. Hereinafter, with reference to FIG. 15, the action setting processing performed in step 47 will be described.

Referring to FIG. 15, the CPU 10 refers to the stepping flag data Dn to determine whether or not the stepping flag is set off (step 111). When the stepping flag is set off, the CPU 10 proceeds to the next step, i.e., step 112. By contrast, when stepping flag is set on, the CPU 10 proceeds to the next step, i.e., step 116.

In step 112, the CPU 10 determines whether or not the latest center-of-gravity position has been moved from the neutral zone to the right foot zone. For example, the CPU 10 uses the latest center-of-gravity position represented by the center-of-gravity position data Dc and the right foot stepping determination line represented by the stepping determination line data Di to determine whether or not the center-of-gravity position has been moved from the neutral zone held between the left foot determination line and the right foot determination line to the right foot zone across the right foot determination line. When the latest center-of-gravity position has been moved from the neutral zone to the right foot zone, the CPU 10 proceeds to the next step, i.e., step 113. By contrast, when the latest center-of-gravity position has not been moved from the neutral zone to the right foot zone, the CPU 10 proceeds to the next step, i.e., step 116.

In step 113, the CPU 10 sets an action of raising the left leg as an action of the player object Po and proceeds to the next step. For example, the CPU 10 sets the action of the player object Po such that the player object Po runs, walks or stops on the spot while raising the left leg, and updates the object action data Dj. Whether the player object Po runs, walks or stops on the spot is set based on the speed represented by the running speed data Dk. The CPU 10 sets the direction of the player object Po in the virtual world in accordance with the direction of the user direction vector represented by the user direction vector data Df and updates the object action data Dj. In the case where the direction or position of the virtual camera set in the virtual world is changed in accordance with the direction of the user direction vector or the direction of the player objet Po, data regarding the virtual camera is updated in step 113.

Next, the CPU 10 calculates a running speed and a running distance (step 114) and proceeds to the next step. For example, the CPU 10 sets a time period, from when the action of raising the right leg is set as the action of the player object Po until the current time, as a processing target time period, and calculates a running speed and a running distance using at least one of the length (time) of the processing target time period, the transition of the total load value in the processing target time period, and the transition of the center-of-gravity position in the processing target time period.

For example, the CPU 10 calculates a running speed (speed at which the player object Po moves) based on the length (time) of the processing target time period, and uses the calculated speed to update the running speed data Dk. Specifically, the CPU 10 calculates the speed at which the player object Po moves to be higher as the length of the processing target time period is shorter. In this case, as the pitch at which the user makes a stepping action on the board type controller 9 is shorter, the speed at which the player object Po moves in the virtual world is higher.

A running distance (distance by which the player object Po has moved) is calculated based on the length (time) of the processing target time period and the moving speed of the player object Po calculated as described above, and the calculated distance is used to update the running distance data Dm. Specifically, the CPU 10 calculates the distance by which the player object Po has moved in the virtual world in the processing target time period based on the length of the processing target time period and the moving speed of the player object Po. The CPU 10 adds the calculated moving distance to the running distance represented by the running distance data Dm to calculate a new running distance and uses the new running distance to update the running distance data Dm. The CPU 10 calculates a new position of the player object Po in the virtual world based on the new running distance and the direction of the player object Po, and uses the new position to update the object action data Dj.

Next, the CPU 10 sets the stepping flag on and updates the stepping flag data Dn (step 115). Then, the CPU 10 terminates the processing by this subroutine.

In step 116, the CPU 10 refers to the stepping flag data Dn to determine whether or not the stepping flag is set on. When the stepping flag is set on, the CPU 10 proceeds to the next step, i.e., step 117. By contrast, when the stepping flag is set off, the CPU 10 proceeds to the next step, i.e., step 121.

In step 117, the CPU 10 determines whether or not the latest center-of-gravity position has been moved from the neutral zone to the left foot zone. For example, the CPU 10 uses the latest center-of-gravity position represented by the center-of-gravity position data Dc and the left foot stepping determination line represented by the stepping determination line data Di to determine whether or not the center-of-gravity position has been moved from the neutral zone to the left foot zone across the left foot determination line. When the latest center-of-gravity position has been moved from the neutral zone to the left foot zone, the CPU 10 proceeds to the next step, i.e., step 118. By contrast, when the latest center-of-gravity position has not been moved from the neutral zone to the left foot zone, the CPU 10 proceeds to the next step, i.e., step 121.

In step 118, the CPU 10 sets an action of raising the right leg as an action of the player object Po and proceeds to the next step. For example, the CPU 10 sets the action of the player object Po such that the player object Po runs, walks or stops on the spot while raising the right leg, and update the object action data Dj. Whether the player object Po runs, walks or stops on the spot is set based on the speed represented by the running speed data Dk like in step 113. The CPU 10 sets the direction of the player object Po in the virtual world in accordance with the direction of the user direction vector represented by the user direction vector data Df and updates the object action data Dj. In the case where the direction or position of the virtual camera set in the virtual world is changed in accordance with the direction of the user direction vector or the direction of the player objet Po, data regarding the virtual camera is updated in step 118.

Next, the CPU 10 calculates a running speed and a running distance (step 119) and proceeds to the next step. For example, the CPU 10 sets a time period, from when the action of raising the left leg is set as the action of the player object Po until the current time, as a processing target time period, and calculates a running speed and a running distance using at least one of the length (time) of the processing target time period, the transition of the total load value in the processing target time period, and the transition of the center-of-gravity position in the processing target time period like in step 114.

Next, the CPU 10 sets the stepping flag off and updates the stepping flag data Dn (step 120). Then, the CPU 10 terminates the processing by this subroutine.

In the case where the user is not making an action of stepping with his/her right leg or an action of stepping with his/her left leg (e.g., in the case where the user keeps one of the legs raised during the stepping action or is still with both of the legs lowered) on the board type controller 9, the CPU 10 sets the current action as an action to be continued (step 121) and proceeds to the next step. For example, the CPU 10 sets the action of raising the leg as it is, which is set as the object action at the current time, as the action of the player object Po, and sets the action of running, walking or at a stop on the spot based on the speed represented by the running speed data Dk. Then, the CPU 10 uses the set action to update the object action data Dj. The CPU 10 sets the direction of the player object Po in the virtual world in accordance with the direction of the user direction vector represented by the user direction vector data Df, and updates the object action Dj. In the case where the direction or position of the virtual camera set in the virtual world is changed in accordance with the direction of the user direction vector or the direction of the player objet Po, data regarding the virtual camera is updated in step 121.

Next, the CPU 10 calculates the running speed and the running distance (step 122) and terminates the processing by this subroutine. For example, the CPU 10 decreases the speed represented by the running speed data Dk by a predetermined value and uses the post-decrease attenuation speed to update the running speed data Dk. Specifically, the CPU 10 calculates the distance by which the player object Po has moved in the virtual world based on the speed of the player object Po, and adds the calculated moving distance to the running distance represented by the running distance data Dm to calculate a new running distance. The CPU 10 uses the new running distance to update the running distance data Dm. The CPU 10 calculates a new position of the player object Po in the virtual world based on the new running distance and the direction of the player object Po, and uses the new position to update the object action data Dj.

Referring back to FIG. 11, after the action setting processing in step 47, the CPU 10 performs display control processing (step 48) and proceeds to the next step. For example, the CPU 10 allows the player object Po to make an action and locates the player object Po in the virtual world based on the action, the position and the direction of the object represented by the object action data Dj. Then, the CPU 10 displays the player object Po on the monitor 2. The CPU 10 may generate running information (e.g., text information) based on the running speed data Dk and the running distance data Dm and display the running information on the monitor 2.

Next, the CPU 10 determines whether or not to terminate the game (step 49). A condition for terminating the game is, for example, that a condition for making the game over or clear is fulfilled, or that the player has made an operation to terminate the game. When the game is not to be terminated, the CPU 10 returns to step 42 to repeat the processing. When the game is to be terminated, the CPU 10 terminates the processing by the flowchart.

As described above, according to the above-described processing, the direction of the user making a stepping action on the board type controller 9 can be determined Therefore, the determination on the action of the user can be accurately made. For example, by setting such a direction as a direction input, the direction can be used as an operation input for various types of information processing.

In the above example, the direction of the player object Po in the virtual world is changed in accordance with the user direction of the user making a stepping action on the board type controller 9. In accordance with the user direction, any other processing may be performed. For example, in accordance with the user direction, the processing of changing the direction of the virtual camera for generating the virtual world to be displayed on the monitor 2 may be performed. In this case, the direction of the line of sight with respect to the virtual world is changed in accordance with the direction of the user making a stepping action on the board type controller 9. Therefore, a virtual world that the user can see when walking in the virtual world can be displayed on the monitor 2, and an image which allows the user to feel as if he/she was in the virtual world can be displayed. In this manner, the user direction can be used for controlling the directions of various characters and various objects in the virtual world, a virtual camera and the like.

In the above example, by changing the direction of the stepping determination lines (neutral zone) in accordance with the user direction, an accurate determination on the user action of the user making a stepping action on the board type controller 9 is made. Namely, in the state where the stepping determination lines (neutral zone) are fixed, it is difficult to make an accurate determination on the stepping action of the user when the user changes the direction of making the stepping action. However, by changing the stepping determination lines (neutral zone) in accordance with the change of such a direction, an accurate determination on the action is made possible. In this manner, the user direction is effective for controlling the determination lines used to make a determination on the user action in addition to for controlling the direction of the object in the virtual world or the virtual camera, and thus is usable for changing conditions for any other determination processing, needless to say.

For example, the above-described stepping determination lines (neutral zone) can be used to make a determination on a bending and stretching (jumping) action of the user on the board type controller 9. For example, in the case where the latest center-of-gravity position is in the neutral zone, when the total load value is not less than a predetermined threshold value (e.g., a value obtained by multiplying the body weight of the user by a predetermined ratio), it is determined that the user has made a bending and stretching action on the board type controller 9. For a determination on such an action also, the neutral zone can be changed in accordance with the user direction, and therefore the determination on the action can be made more accurately.

In the above description of processing, the control on the direction of the object or the virtual camera is immediately associated with a change of the user direction of the user making a stepping action on the board type controller 9. Alternatively, the control on the direction of the object or the virtual camera may be made with a delay of a predetermined time period after the user direction is changed. In this case, after the user direction is changed, the direction of the object or the virtual camera is changed following the change of the user direction with a delay of a predetermined time period.

In the above-described example of information processing, in the case where the direction of the estimated direction vector is present in the inversion range, the direction of the estimated direction vector is inverted to improve the determination precision. Alternatively, the processing of inverting the direction may be performed in any other stage of processing. For example, for updating the direction of the user direction vector in the processing of step 65 or step 67, the direction of the user direction vector may be inverted in the case where the direction of the newly set user direction vector is present in the inversion range. In this case, the processing of inverting the direction of the user direction vector may be added to the processing of inverting the direction of the estimated direction vector in step 54 or step 55, or the processing of inverting the direction of the estimated direction vector may be replaced with the processing of inverting the direction of the user direction vector.

In the above-described example of information processing, the direction of the user direction vector candidate is calculated by adding a plurality of estimated direction vectors. Alternatively, the direction of one estimated direction vector may be set as the direction of the user direction vector candidate. In this case, after the estimated direction vector is calculated in step 44, the processing of step 45 is performed. The estimated direction vector is normalized in step 62 to calculate the user direction vector candidate without the processing in step 61. Even in such a case, the length of the gap, between two centers of gravity used for calculating the one estimated direction vector used to find the user direction vector candidate, is set to the center-of-gravity moving amount Mg. Owing to this, the weighting for changing the user direction is made possible when the gap between the two centers of gravity is long.

In the above-described example of processing, the estimated direction vector is calculated in repletion using a differential vector connecting two center-of-gravity positions calculated successively at different timings. Alternatively, the estimated direction vector may be calculated using any other center-of-gravity position. For example, such two center-of-gravity positions do not need to be successive as long as being calculated at different timings. One center-of-gravity position and another center-of-gravity position calculated with a delay of a predetermined time period after the one center-of-gravity position is calculated may be used to calculate the estimated direction vector.

In the above-described example of processing, a determination is made on the stepping action of the user on the board type controller 9 using two determination lines (left foot stepping determination line and right foot stepping determination line). By providing a neutral zone like this, even when the center-of-gravity position is moved in various directions in an area including the determination lines, the determination on the stepping action is prevented from being made in repetition. In the case where such an effect is not expected, one determination line (e.g., the reference determination line; see FIG. 9) may be provided for making a determination on the stepping action of the user. In this case, when the center-of-gravity position is moved from one side of the determination line to the other side of the determination line, it is determined that the user has made a stepping action with one leg; and when the center-of-gravity position is moved from the other side of the determination line to the one side of the determination line, it is determined that the user has made a stepping action with the other leg.

In the above-described example of the game, an image of the virtual world including at least the player object Po is displayed on the monitor 2. Alternatively, a virtual world of any other form may be displayed on the monitor 2. For example, an image of a virtual world as seen from the player object Po subjectively may be displayed on the monitor 2 without the player object Po being displayed. In this case, a depth direction of the virtual world which is displayed on the monitor 2 from a subjective viewpoint may be the same as, or different from, the moving direction of the player object Po. In the case where the depth direction of the virtual world which is displayed on the monitor 2 from the subjective viewpoint is the same as the moving direction of the player object Po, the virtual world having the moving direction as the depth direction is displayed on the monitor 2. Therefore, the operation of setting the moving direction can be made intuitively and it is made easy to match the moving direction to a direction desired by the user, needless to say.

In the above-described example of the system, one installation type image display device (monitor 2) is used for displaying the virtual world. Alternatively, a portable image display device may be used. For example, in the case where the user holds a portable image display device and makes a stepping action on the board type controller 9 while watching an image on the image display device, even when the user changes the direction of making a stepping action, the direction of the image display device held by the user can also be changed. Therefore, the image of the virtual world is easy to see for the user, and the game is considered to be made more realistic. In this case, the above-described installation type image display device (monitor 2) may be replaced with a portable image display device, or the system may use a portable image display device in addition to the installation type image display device.

In the above-described example of processing, an image of the player object Po running or walking in the virtual world is displayed on the monitor 2 in accordance with the action of the user on which a determination has been made by use of the board type controller 9. Alternatively, the example embodiment is applicable to any other type of information processing, needless to say. For example, an image of the player object Po moving in the virtual world while operating a vehicle such as a bicycle, a monocycle or the like may be displayed on the monitor 2 in accordance with the action of the user on which a determination has been made by use of the board type controller 9.

In the above description, the board type controller 9 includes four load sensors 94a through 94d. As long as information on the center-of-gravity position of the load applied on the board type controller 9 is acquired, the number of load sensors may be five or greater, or three.

In the above description, the controller 7 and the game apparatus main body 5 are connected to each other by wireless communication and also the board type controller 9 and the game apparatus main body 5 are connected to each other by wireless communication. Wireless communication may be performed in any other form. In a first example, operation data on the board type controller 9 is wirelessly transmitted to the controller 7, and the controller 7 wirelessly transmits operation data on the controller 7, together with the operation data received from the board type controller 9, to the game apparatus main body 5. In this case, the controller 7 and the game apparatus main body 5 are directly connected to each other by wireless communication, whereas the board type controller 9 and the game apparatus main body 5 are connected to each other by wireless communication via the controller 7. In a second example, operation data on the controller 7 is wirelessly transmitted to the board type controller 9, and board type controller 9 wirelessly transmits operation data on the board type controller 9, together with the operation data received from the controller 7, to the game apparatus main body 5. In this case, the board type controller 9 and the game apparatus main body 5 are directly connected to each other by wireless communication, whereas the controller 7 and the game apparatus main body 5 are connected to each other by wireless communication via the board type controller 9. In a third example, the controller 7 and the board type controller 9 are electrically connected to each other via a cable, and operation data on the board type controller 9 is transmitted to the controller 7 via the cable. The controller 7 wirelessly transmits operation data on the controller 7, together with the operation data received from the board type controller 9 via the cable, to the game apparatus main body 5. In a fourth example, the controller 7 and the board type controller 9 are electrically connected to each other via a cable, and operation data on the controller 7 is transmitted to the board type controller 9 via the cable. The board type controller 9 wirelessly transmits operation data on the board type controller 9, together with the operation data received from the controller 7 via the cable, to the game apparatus main body 5.

The controller 7 and/or board type controller 9 and the game apparatus main body 5 may be electrically connected to each other via a cable. In this case, the cable connected to the controller 7 and/or board type controller 9 is connected to a connection terminal of the game apparatus main body 5. In a first example, the controller 7 and the game apparatus main body 5 are electrically connected to each other via a first cable, and the board type controller 9 and the game apparatus main body 5 are electrically connected to each other via a second cable. In a second example, only the controller 7 and the game apparatus main body 5 are electrically connected to each other via a cable. In this case, operation data on the board type controller 9 may be first wirelessly transmitted to the controller 7 and then transmitted from the controller 7 to the game apparatus main body 5 via the cable, or may be wirelessly transmitted to the game apparatus main body 5 directly from the board type controller 9. In a third example, only the board type controller 9 and the game apparatus main body 5 are electrically connected to each other via a cable. In this case, operation data on the controller 7 may be first wirelessly transmitted to the board type controller 9 and then transmitted from the board type controller 9 to the game apparatus main body 5 via the cable, or may be wirelessly transmitted to the game apparatus main body 5 directly from the controller 7.

In the above example, the installation type game apparatus 3 is used for the description. Alternatively, an information processing program according to the example embodiment may be executed by an information processing apparatus, such as a mobile game apparatus, a general personal computer or the like to carry out the example embodiment; or in any other example, by any mobile electronic device, for example, a PDA (Personal Digital Assistant), a mobile phone, a personal computer, a camera, or the like, as well as the game apparatus. Any device can carry out the example embodiment when being connected to the board type controller 9 wirelessly or in a wired manner.

In the above description, the information processing is executed by the game apparatus main body 5. Alternatively, at least a part of the processing steps in the information processing may be performed by another apparatus. For example, in the case where the game apparatus main body 5 is communicable with another apparatus (e.g., server or another game apparatus), the processing steps in the information processing may be performed by cooperation of the game apparatus main body 5 and the another apparatus. For example, it is conceived that the another apparatus performs the processing of setting a player object Po, a virtual world and the like, and object action data, running speed data, running distance data and the like are transmitted from the game apparatus main body 5 to the another apparatus, which performs the information processing. Then, image data representing a virtual world generated in the another apparatus is transmitted to the game apparatus main body 5, and the virtual world is displayed on the monitor 2. In this manner, when at least a part of the processing steps in the information processing is performed by another apparatus, substantially the same processing as the above-described information processing can be performed. At least a part of the processing steps in the information processing may be performed by the board type controller 9 (microcomputer 100). The above-described information processing can be executed by one processor or by cooperation of a plurality of processors included in an information processing system which includes at least one information processing apparatus. In the above-described example, the processing shown in the flowcharts is performed by the CPU 10 of the game apparatus main body 5 executing a predetermined program. Alternatively, a part or the entirety of the processing may be performed by a dedicated circuit included in the game apparatus main body 5.

The shape of the game apparatus main body 5, the shapes of the controller 7 and the board type controller 9, and the shapes, numbers, positions and the like of various operation buttons and sensors described above, are merely examples. Needless to say, any other shapes, numbers, and positions may be adopted to carry out the example embodiment. The processing sequences, set values, display modes, and values used for determination and the like, which are used in the above-described information processing are merely examples. Needless to say, any other sequences, display modes, and values may be adopted to carry out the example embodiment.

The above-described information processing program (game program) may be supplied to the game apparatus main body 5 via a wired or wireless communication circuit, as well as via an external storage medium such as the optical disc 4 or the like. The information processing program may be stored in advance on a nonvolatile storage device inside the game apparatus main body 5. Examples of the information storage medium for storing the information processing program thereon include CD-ROMs, DVDs, optical disc-type storage mediums similar thereto, flexible discs, hard discs, magneto-optical discs, magnetic tapes and the like. The information storage mediums for storing the information processing program thereon may be a nonvolatile semiconductor memory or a volatile memory. Such a storage medium is considered as a storage medium readable by a computer or the like. For example, it is possible to provide the above-described various functions by causing a computer or the like to read and execute the programs stored on these storage mediums.

While some system examples, method examples, device examples, and apparatus examples have been described in detail, the foregoing description is in all aspects illustrative and not restrictive. It is to be understood that numerous other modifications and variations can be devised without departing from the spirit and scope of the appended claims. It is also to be understood that the scope of the example embodiment is indicated by the appended claims rather than by the foregoing description. It is also to be understood that the detailed description herein enables one skilled in the art to make changes coming within the meaning and equivalency range of the example embodiment. It is to be understood that as used herein, the singular forms used for elements and the like with "a" or "an" are not intended to exclude the plural forms thereof, It should be also understood that the terms as used herein have definitions typically used in the art unless otherwise mentioned. Thus, unless otherwise defined, all scientific and technical terms used herein have the same meanings as those generally used by those skilled in the art to which the example embodiment. If there is contradiction, the present specification (including the definitions) precedes.

A storage medium having an information processing program stored thereon, an information processing apparatus, an information processing system and an information processing method according to the example embodiment are useful as an information processing program, an information processing apparatus, an information processing system and an information processing method capable of making an accurate determination on an action of a user and performing processing or the like based on the action of the user.

What is claimed is:

1. A non-transitory computer-readable storage medium having an information processing program stored thereon, the information processing program being executable by a computer of an information processing apparatus configured to use data which is output from an input device configured to allow a body of a user to get thereon and is based on a load applied on the input device, the information processing apparatus being for processing data acquired from the input device, wherein the information processing program allows the computer to provide execution comprising:
   repeatedly acquiring a center-of-gravity position of a load applied on the input device, based on data output from the input device;
   calculating a user direction of a stepping action made on the input device using a direction candidate which is a direction perpendicular to a straight line connecting two center-of-gravity positions acquired at different timings; and
   performing predetermined processing based on the user direction.

2. The non-transitory computer-readable storage medium having an information processing program stored thereon according to claim 1, wherein the user direction is calculated using the direction candidate which is the direction perpendicular to the straight line connecting the two center-of-gravity positions acquired at different timings successively.

3. The non-transitory computer-readable storage medium having an information processing program stored thereon according to claim 1, wherein the user direction is updated by making the user direction determined by immediately previous processing closer to a direction represented by the direction candidate by a predetermined ratio.

4. The non-transitory computer-readable storage medium having an information processing program stored thereon according to claim 3, wherein the ratio is set to be larger as a distance between the center-of-gravity positions used for calculating the direction candidate is longer.

5. The non-transitory computer-readable storage medium having an information processing program stored thereon according to claim 4, wherein the user direction determined by the immediately previous processing is not changed when the distance between the center-of-gravity positions used for calculating the direction candidate is shorter than a predetermined length.

6. The non-transitory computer-readable storage medium having an information processing program stored thereon according to claim 1, wherein a direction candidate which is a direction perpendicular to a straight line connecting two center-of-gravity positions acquired at different timings repeatedly is repeatedly calculated, and one candidate direction is calculated based on a plurality of direction candidates repeatedly calculated.

7. The non-transitory computer-readable storage medium having an information processing program stored thereon according to claim 1, wherein one of a pair of directions perpendicular to the straight line which is closer to the user direction set currently is calculated as the direction candidate.

8. The non-transitory computer-readable storage medium having an information processing program stored thereon according to claim 1, wherein when one of a pair of directions perpendicular to the straight line is present within a predetermined range, the other direction is calculated as the direction candidate.

9. The non-transitory computer-readable storage medium having an information processing program stored thereon according to claim 1, wherein a direction candidate vector which is a direction perpendicular to a straight line connecting two center-of-gravity positions acquired at different timings repeatedly and has a size equal to a distance between the two center-of-gravity positions is repeatedly calculated, and a direction of one vector obtained by adding a plurality of direction candidate vectors calculated repeatedly is calculated as the direction candidate.

10. The non-transitory computer-readable storage medium having an information processing program stored thereon according to claim 9, wherein one of a pair of directions perpendicular to the straight line which is closer to the user direction set currently is calculated as the direction of the direction candidate vector.

11. The non-transitory computer-readable storage medium having an information processing program stored thereon according to claim 9, wherein when one of a pair of directions perpendicular to the straight line is present within a predetermined range, the other direction is calculated as the direction of the direction candidate vector.

12. The non-transitory computer-readable storage medium having an information processing program stored thereon according to claim 1, wherein:
the information processing program allows the computer to further provide execution comprising setting at least one determination line extending in the calculated user direction; and
when the center-of-gravity position acquired repeatedly crosses the determination line, it is determined that the user has made a stepping action on the input device and the predetermined processing is performed based on the determination.

13. The non-transitory computer-readable storage medium having an information processing program stored thereon according to claim 12, wherein:
the information processing program allows the computer to further provide execution comprising calculating a stepping central position of the user making the stepping action on the input device, based on the acquired center-of-gravity position; and
the determination line is set at a position, in the user direction, having the stepping central position as a reference.

14. The non-transitory computer-readable storage medium having an information processing program stored thereon according to claim 13, wherein:
two said determination lines extending in the user direction at positions which have the stepping central position as the center therebetween and are distanced from the stepping central position by a predetermined gap is set; and
it is determined that the user has made a stepping action with one of user's legs on the input device when the center-of-gravity position crosses one of the determination lines after moving across the gap, it is determined that the user has made a stepping action with the other of the user's legs on the input device when the center-of-gravity position crosses the other of the determination lines after moving across the gap, and the predetermined processing is performed based on the determination.

15. The non-transitory computer-readable storage medium having an information processing program stored thereon according to claim 13, wherein the stepping central position is set at a position which follows, at a predetermined ratio, the center-of-gravity position acquired repeatedly.

16. The non-transitory computer-readable storage medium having an information processing program stored thereon according to claim 13, wherein the stepping central position is set at a position obtained by averaging the center-of-gravity positions acquired repeatedly during a predetermined time period.

17. The non-transitory computer-readable storage medium having an information processing program stored thereon according to claim 14, wherein a width of the gap is changed in accordance with an angle of the user direction with respect to a predetermined reference direction.

18. The non-transitory computer-readable storage medium having an information processing program stored thereon according to claim 1, wherein the predetermined processing is performed by changing a direction of at least one of an object set in a virtual world and a virtual camera, based on the user direction.

19. An information processing apparatus configured to use data which is output from an input device configured to allow a body of a user to get thereon and is based on a load applied on the input device, the information processing apparatus comprising at least one processor configured to process data acquired from the input device, the information processing apparatus configured to:
repeatedly acquire a center-of-gravity position of a load applied on the input device, based on data output from the input device;
calculate a user direction of a stepping action made on the input device using a direction candidate which is a direction perpendicular to a straight ling connecting two center-of-gravity positions acquired at different timings; and
perform predetermined processing based on the user direction.

20. An information processing system which includes a plurality of apparatuses communicable to each other and is configured to use data which is output from an input device configured to allow a body of a user to get thereon and is based on a load applied on the input device, the information processing system being for processing data acquired from the input device, the information processing system comprising:
a processing system having at least one processor, the processing system configured to:
repeatedly acquire a center-of-gravity position of a load applied on the input device, based on data output from the input device,
calculate a user direction of a stepping action made on the input device using a direction candidate which is a direction perpendicular to a straight line connecting two center-of-gravity positions acquired at different timings, and perform predetermined processing based on the user direction.

21. An information processing method executed by one processor or cooperation of a plurality of processors included in an information processing system which includes at least one information processing apparatus configured to use data which is output from an input device configured to allow a body of a user to get thereon and is based on a load applied on the input device, the information processing apparatus being configured to process data acquired from the input device, the method comprising:
repeatedly acquiring a center-of-gravity position of a load applied on the input device, based on data output from the input device;
calculating a user direction of a stepping action made on the input device using a direction candidate which is a direction perpendicular to a straight line connecting two center-of-gravity positions acquired at different timings; and
performing predetermined processing based on the user direction.

* * * * *